US012623920B2

(12) United States Patent (10) Patent No.: US 12,623,920 B2
Min et al. (45) Date of Patent: May 12, 2026

(54) WATER PURIFIER

(71) Applicant: COWAY CO., LTD., Gongju-si (KR)

(72) Inventors: Ki Hong Min, Seoul (KR); Man Uk Park, Seoul (KR); Yong Yeon Noh, Seoul (KR); Dae Hwan Kim, Seoul (KR); Doo Won Han, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 441 days.

(21) Appl. No.: 18/259,900

(22) PCT Filed: Dec. 30, 2021

(86) PCT No.: PCT/KR2021/020288
§ 371 (c)(1),
(2) Date: Jun. 29, 2023

(87) PCT Pub. No.: WO2022/146079
PCT Pub. Date: Jul. 7, 2022

(65) Prior Publication Data
US 2024/0067535 A1 Feb. 29, 2024

(30) Foreign Application Priority Data
Dec. 31, 2020 (KR) ........................ 10-2020-0189029

(51) Int. Cl.
*C02F 1/00* (2023.01)
*B01D 35/34* (2006.01)
(Continued)

(52) U.S. Cl.
CPC .............. *C02F 1/001* (2013.01); *B01D 35/34* (2013.01); *C02F 1/003* (2013.01); *F16L 37/08* (2013.01);
(Continued)

(58) Field of Classification Search
CPC ...... C02F 1/001; C02F 1/003; C02F 2103/02; C02F 2201/005; C02F 2209/003;
(Continued)

(56) References Cited

U.S. PATENT DOCUMENTS 9,468,872 B2 * 10/2016 Laverdiere ............. B01D 65/00

FOREIGN PATENT DOCUMENTS

CN 211813481 U * 10/2020
JP 2006-21190 A 1/2006
(Continued)

OTHER PUBLICATIONS

International Search Report issued Apr. 11, 2022 in PCT/KR2021/020288 filed on Dec. 30, 2021, 2 pages.
(Continued)

*Primary Examiner* — Liam Royce
(74) *Attorney, Agent, or Firm* — Oblon, McClelland, Maier & Neustadt, L.L.P.

(57) ABSTRACT

A water purifier includes: a filter module for providing purified water by filtering raw water; a fitting valve module detachably fastened to the filter module to provide at least one of a flow path for a flow of raw water supplied to the filter module and a flow path for a flow of the purified water discharged from the filter module; and a frame including a valve support for movably supporting the fitting valve module to be movable. The fitting valve module is selectively placed in a separated state in which the fitting valve module is separated from the filter module by moving in a direction away from the filter module, or a coupled state in which the fitting valve module coupled to the filter module by moving toward the filter module.

11 Claims, 18 Drawing Sheets

(51) Int. Cl.
*C02F 103/02* (2006.01)
*F16L 37/08* (2006.01)

(52) U.S. Cl.
CPC .... *C02F 2103/02* (2013.01); *C02F 2201/005* (2013.01); *C02F 2209/003* (2013.01); *C02F 2307/10* (2013.01)

(58) Field of Classification Search
CPC ...... C02F 2307/10; B01D 35/34; F16L 37/08; B67D 1/00; B67D 1/08; B67D 1/0831; B67D 1/0014; B67D 1/0841; B67D 2001/0093; B67D 2210/0001; B67D 2210/00031; B67D 2210/00062
See application file for complete search history.

(56) References Cited

FOREIGN PATENT DOCUMENTS

| | | | | |
|---|---|---|---|---|
| JP | 2009-119388 | A | 6/2009 | |
| KR | 20-0386870 | Y1 | 6/2005 | |
| KR | 10-2013-0076697 | A | 7/2013 | |
| KR | 20130076697 | A * | 7/2013 | .............. C02F 1/001 |
| KR | 10-2017-0119646 | A | 10/2017 | |
| KR | 10-2020-0083758 | A | 7/2020 | |
| KR | 10-2020-0105121 | A | 9/2020 | |

OTHER PUBLICATIONS

Japanese Notice of Reasons for Refusal issued Jun. 11, 2024 in Japanese Application No. 2023-535919 with English translation, 10 pgs.

* cited by examiner

Z(UP)

(RIGHT)        (REAR)

Y(FRONT)        X(LEFT)

(DOWN)

WATER PURIFIER

TECHNICAL FIELD

The present disclosure relates to a water purifier.

BACKGROUND ART

In general, a water purifier is a device that receives water from a water supply source such as tap water, filters it into purified water through a filter provided therein, and then provides purified water to a user. In addition, purified water may be provided to a user as cold water cooled below a predetermined temperature or hot water heated above a predetermined temperature by the water purifier.

Meanwhile, when the filter provided in the water purifier has filtered water for a long time and its lifespan has been over, the filter needs to be replaced. In the past, when replacing the filter of the water purifier, a technician skilled in the water purifier had to replace the filter due to risks such as malfunction due to incomplete fastening and malfunction of the water purifier due to water leakage during filter replacement. Accordingly, until replacement of the filter by a skilled technician, the user had no choice but to use the filter whose lifespan had expired, which was inconvenient. In order to solve this inconvenience, a conventional water purifier includes a device for easily replacing a filter even by general users who are not skilled technicians. In other words, the conventional water purifier has a separate attachment/detachment device capable of attaching and detaching the filter to and from the water purifier.

However, the conventional water purifier has a problem in that the volume of the water purifier may increase since a separate space for accommodating the attachment/detachment device needs to be provided inside the water purifier. In addition, since an inner space of the water purifier is getting smaller according to the recent miniaturization trend of the water purifier, there is a problem in that it is difficult to accommodate the separate attachment/detachment device in the inner space of the water purifier.

In this regard, Korean Patent Application Publication No. 10-2020-0105121 of Cheongho Nais Co., Ltd. "Filter coupling structure and water purifier including the same" (hereinafter, Patent Document 1) discloses a water purifier whose filter member is separated from a flow path as a lever member supported by a main body rotates.

However, according to the water purifier disclosed in Patent Document 1, in order to remove a filter from the main body of the water purifier, a user has to rotate the lever member in an up-down direction, so there arises a problem in that it is inconvenient to replace the filter. In addition, in the water purifier of Patent Document 1, when removing the filter, the user needs to hold and pull the filter itself, rather than moving a fitting valve engaged with the filter. In other words, in the water purifier of Patent Document 1, the filter needs to be pulled in a horizontal direction when removing the filter, but a general user cannot easily remove the filter since he or she simply grips and pulls a body of the filter (a portion where a filter medium is accommodated). Furthermore, when a user who is not skilled in filter removal pulls the filter with excessively large force in a direction different from the filter removal direction, an opening of the filter and the fitting valve of the water purifier main body may be damaged.

In addition, Korean Patent Application Publication No. 10-2020-0083758 of Picogram Co., Ltd. "Lever-type attachment/detachment device for water purifying filter of water purifier" (hereinafter, Patent Document 2) discloses an attachment/detachment device for a water purifier through which a water purifying filter can be separated from a flow path as a locking lever is rotated in a main body.

However, according to the water purifier disclosed in Patent Document 2, in order to remove the filter from the main body of the water purifier, a user has to rotate the locking lever in the up-down direction, so there arises a problem in that the filter replacement is inconvenient. In addition, in the water purifier of Patent Document 2, as in the water purifier of Patent Document 1 described above, when removing the filter, the user needs to grip and pull the filter itself, rather than moving a fitting valve engaged with the filter. In other words, even in the water purifier of Patent Document 2, a user needs to pull the filter horizontally to remove the filter, but a general user simply grips the body of the filter and pulls it, so the general user cannot easily remove the filter. Accordingly, an opening of the filter and the fitting valve in the main body of the water purifier may be damaged due to user's inexperienced operation.

DETAILED DESCRIPTION OF INVENTION

Technical Problems

In view of the above, one embodiment of the present disclosure provides a water purifier in which a filter module can be easily replaced with a small force as a user moves a fitting valve module.

In addition, one embodiment of the present disclosure provides a water purifier capable of supporting the movement of the fitting valve module when the fitting valve module is coupled to and separated from the filter module.

Technical Solution

In accordance with an aspect of the present disclosure, there may be provided a water purifier including: a filter module for providing purified water by filtering raw water; a fitting valve module detachably fastened to the filter module to provide at least one of a flow path for a flow of raw water supplied to the filter module and a flow path for a flow of the purified water discharged from the filter module; and a frame including a valve support for movably supporting the fitting valve module to be movable, wherein the fitting valve module is selectively placed in a separated state in which the fitting valve module is separated from the filter module by moving in a direction away from the filter module, or a coupled state in which the fitting valve module coupled to the filter module by moving toward the filter module.

Further, the frame may include: a filter housing having an open upper side and accommodating the filter module therein; and a filter cap fastened to the filter housing to cover the upper side of the filter housing, and the valve support may be supported on the filter housing.

Further, the valve support may include a guide member extending in a predetermined direction to guide movement of the fitting valve module. The fitting valve module may include: a guide follower having a shape engaged with the guide member to be movable along the guide member; and a locking portion for preventing a posture of the fitting valve module from being tilted beyond a predetermined angle when the fitting valve module is moved.

Further, the fitting valve module and the valve support may be engaged with each other with a gap formed therebetween.

Further, the fitting valve module may further include: a fitting valve selectively engaged with the filter module; and a handle having a shape protruding upward from the fitting valve. The filter cap may have a handle accommodating portion for accommodating the handle when the fitting valve module is in the coupled state, and the filter cap may be configured to interfere with the handle so that the fitting valve module is not fastened to the filter housing when the fitting valve module is in the separated state.

Further, the filter module may include a first filter mouth for introducing the raw water and a second filter mouth for discharging the purified water. The fitting valve module may include: a first fitting valve detachably coupled to the first filter mouth; a second fitting valve detachably coupled to the second filter mouth; and a valve connection portion connecting the first fitting valve and the second fitting valve.

Further, the fitting valve module may include: a fitting valve selectively engaged with the filter module; and a valve hook caught on the valve support when the fitting valve module is placed in a predetermined position in the separated state.

Further, the water purifier may further include: a NOS valve for selectively opening and closing a raw water flow path communicating with the fitting valve module to provide raw water; and a circuit board for controlling the NOS valve to close the raw water flow path to the fitting valve module when the fitting valve module is separated from the coupled state.

Further, the water purifier may further include: a tube coupled to the fitting valve module so as to be bent when the fitting valve module is separated from the coupled state.

Further, a distance between the filter housing and the filter module in a direction in which the fitting valve module moves be smaller than a maximum separation distance between the handle of the fitting valve module and the guide member in the direction in which the fitting valve module moves.

The distance between the filter housing and the filter module in the direction in which the fitting valve module moves may be a gap between the filter housing and the filter module toward the fitting valve module in a state in which the filter module is accommodated in the filter housing.

Effect of Invention

Since the water purifier according to one embodiment of the present disclosure can be coupled to or separated from the filter module as the fitting valve module is moved, the user can easily replace the filter module.

Further, since the movement direction of the fitting valve module can be guided by the valve support in the water purifier according to one embodiment of the present disclosure, it is possible to prevent the fitting valve module from being erroneously coupled to the filter module.

4

Figure 5:
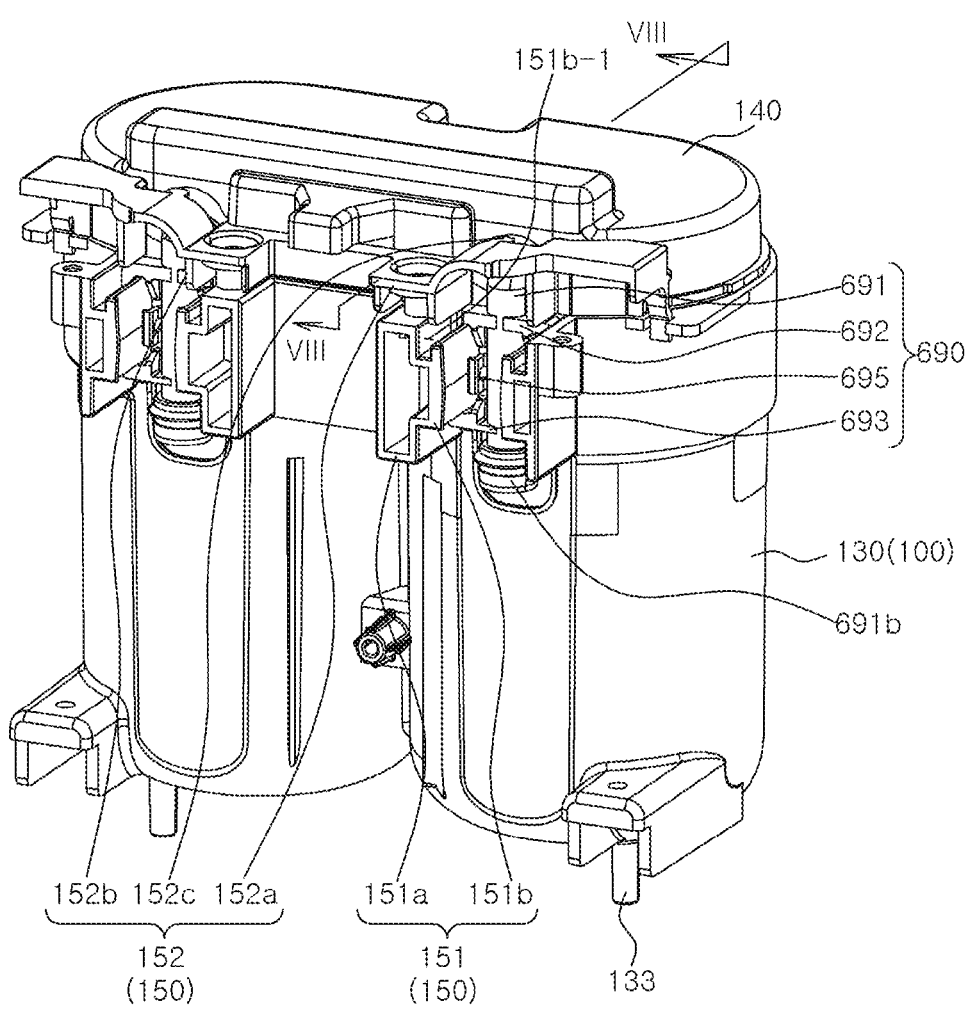
Figure 6:
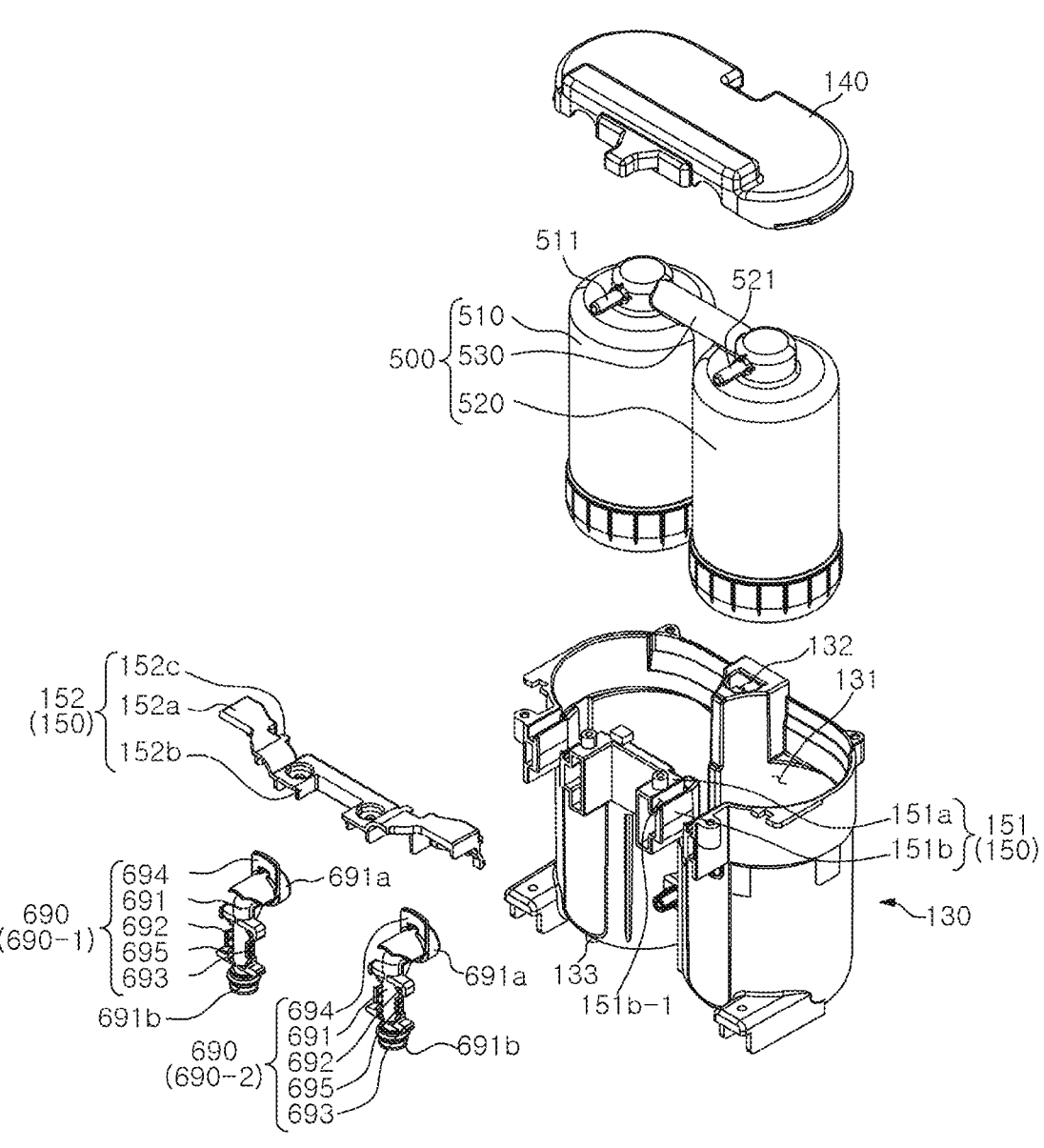
Figure 7:
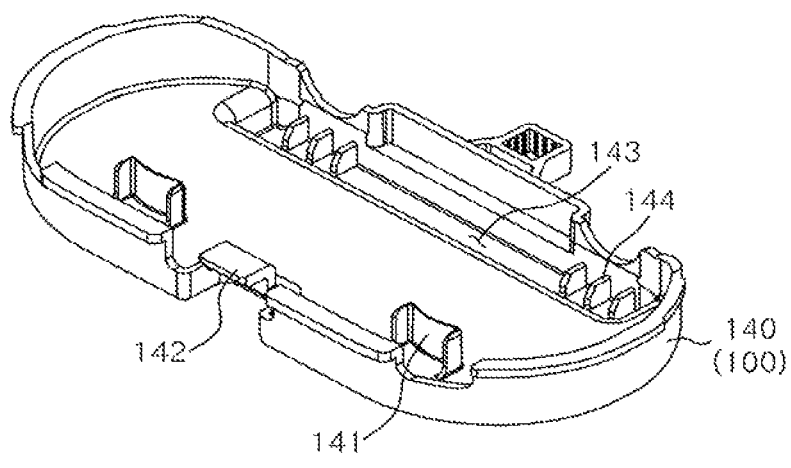
Figure 8:
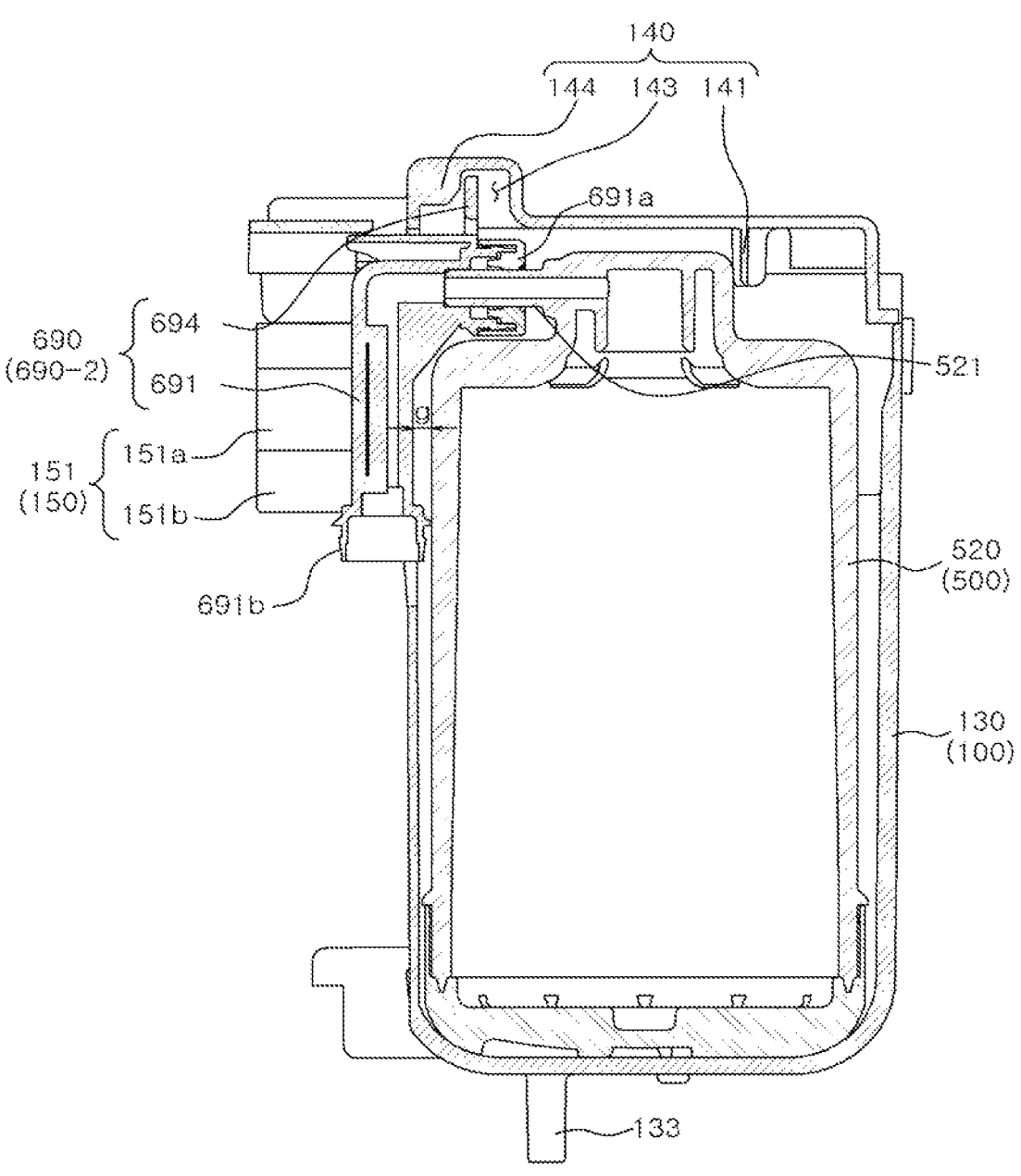
Figure 9:
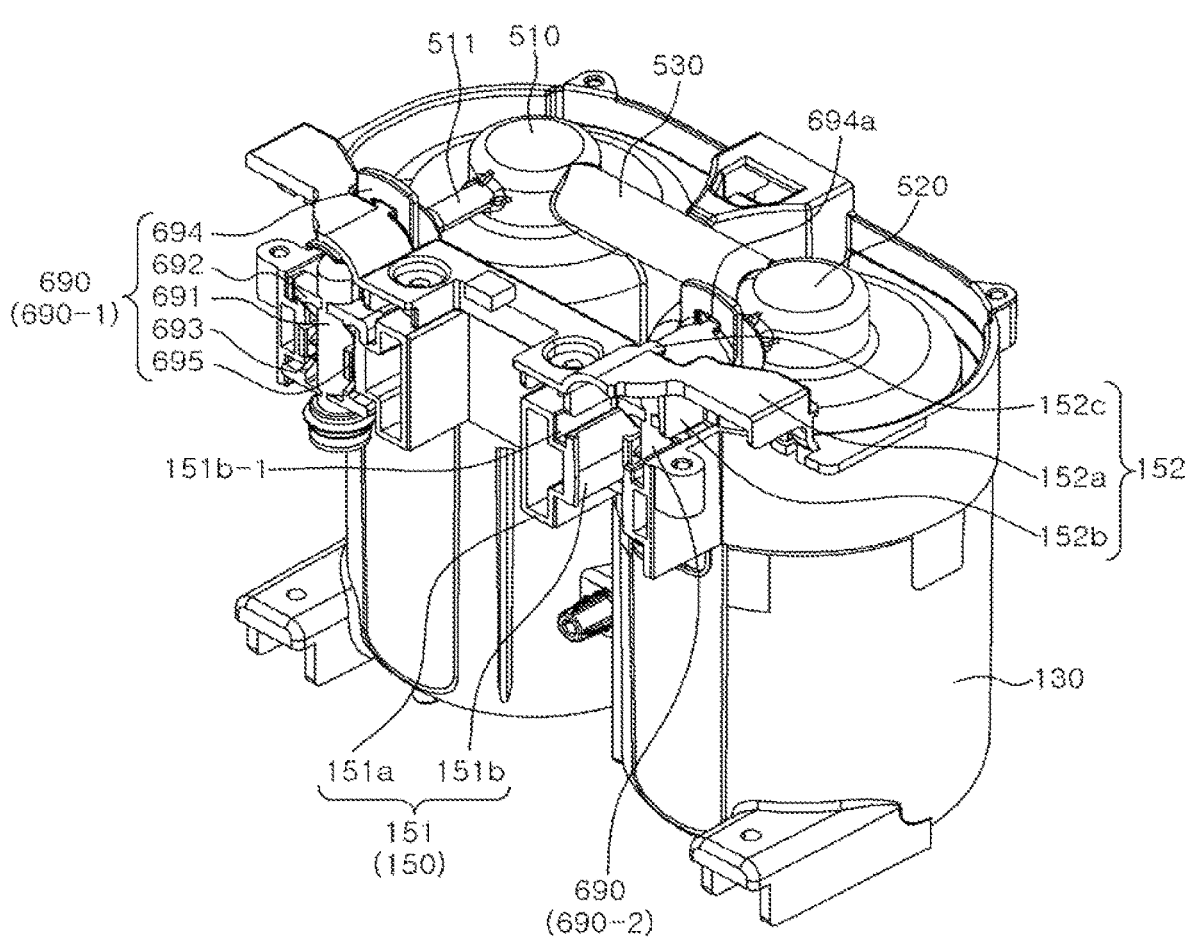
Figure 10:
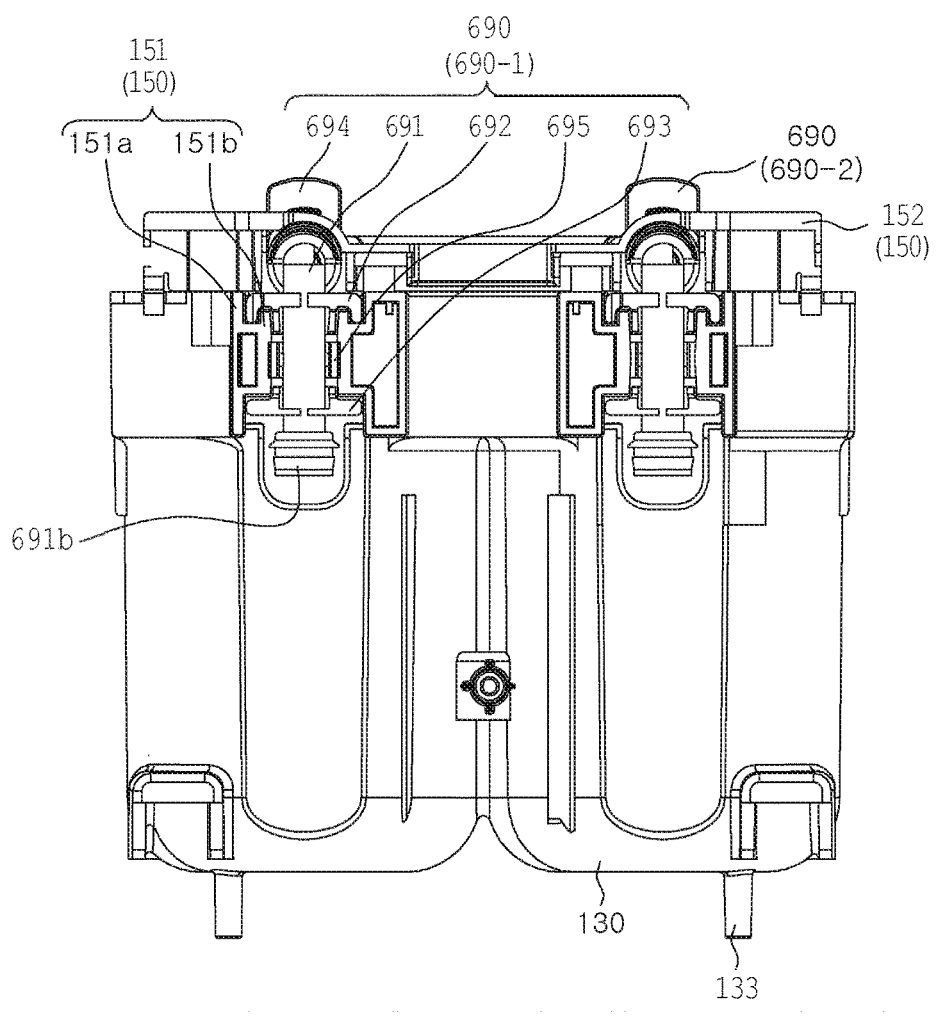
Figure 11:
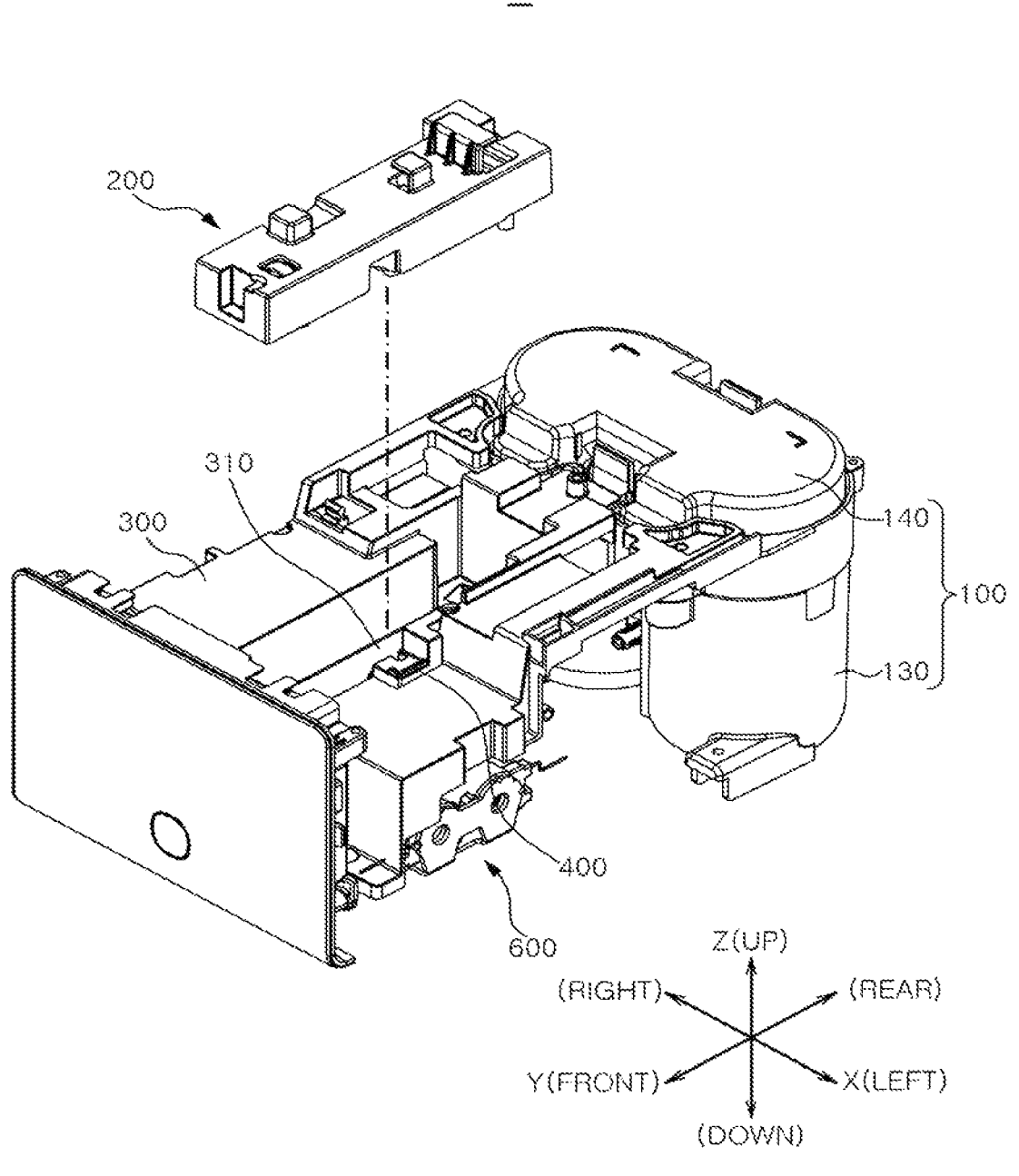
Figure 12:
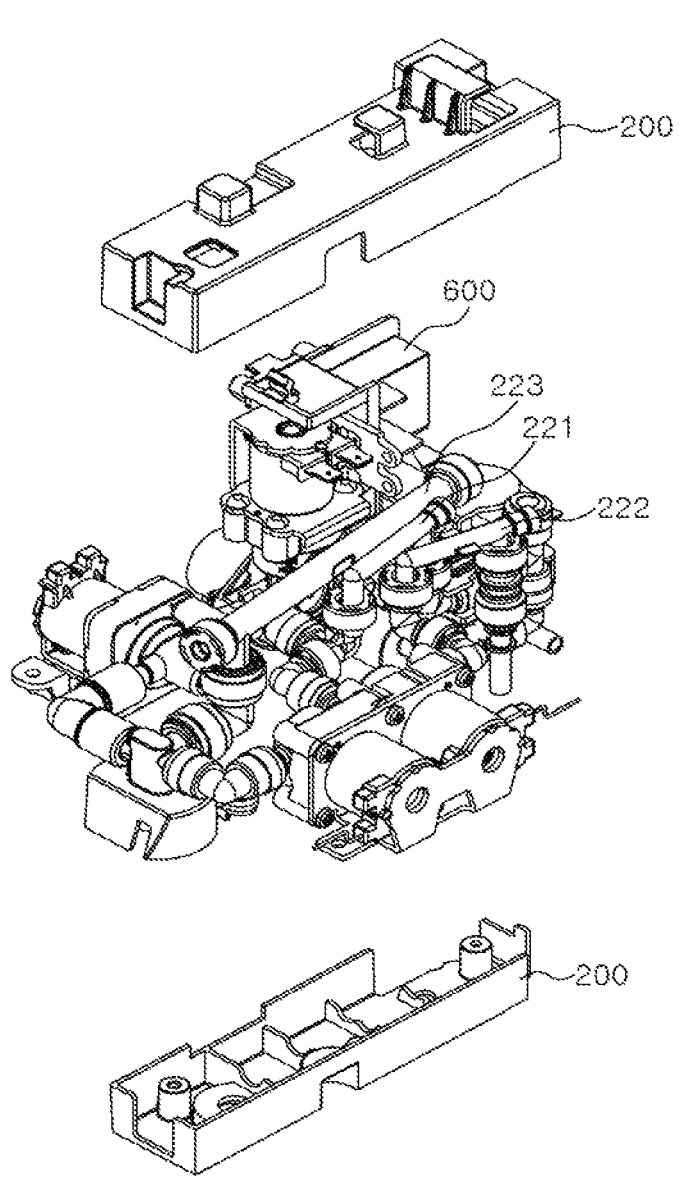
Figure 13:
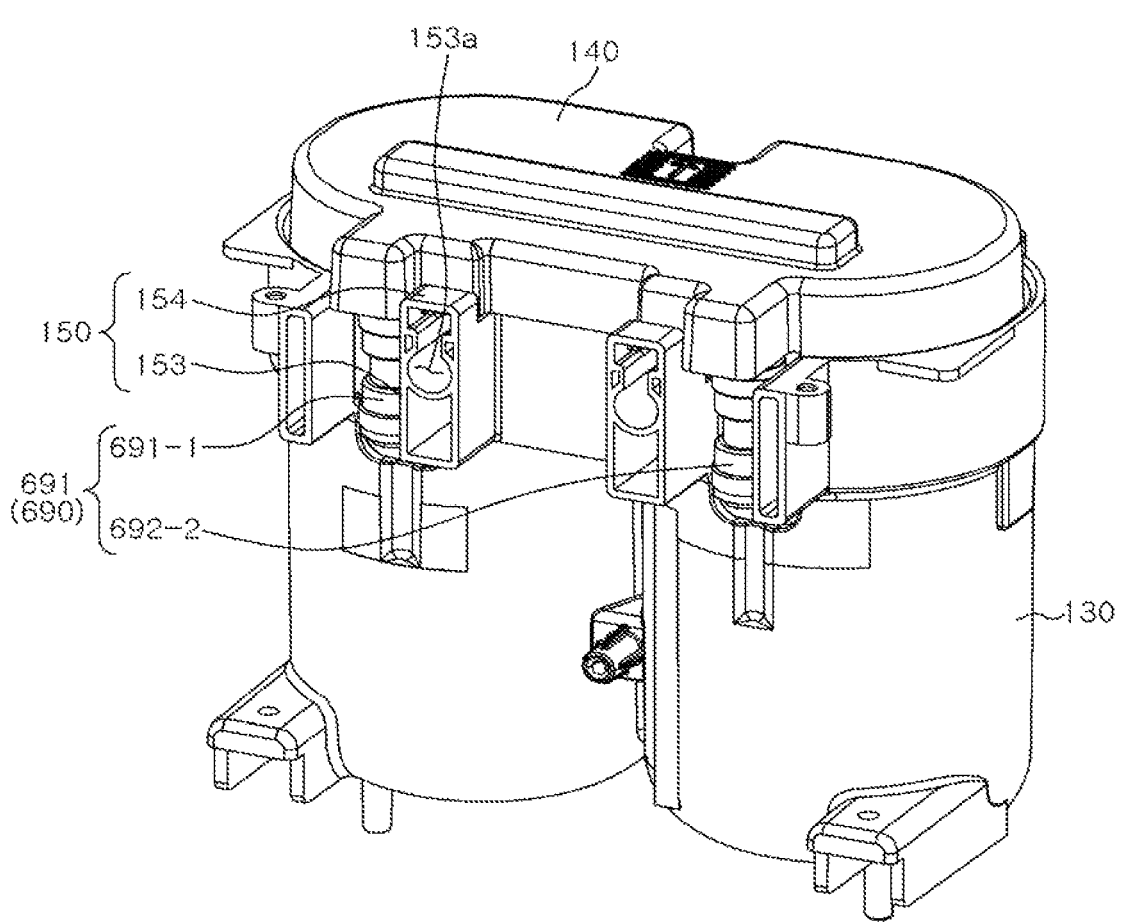
Figure 14:
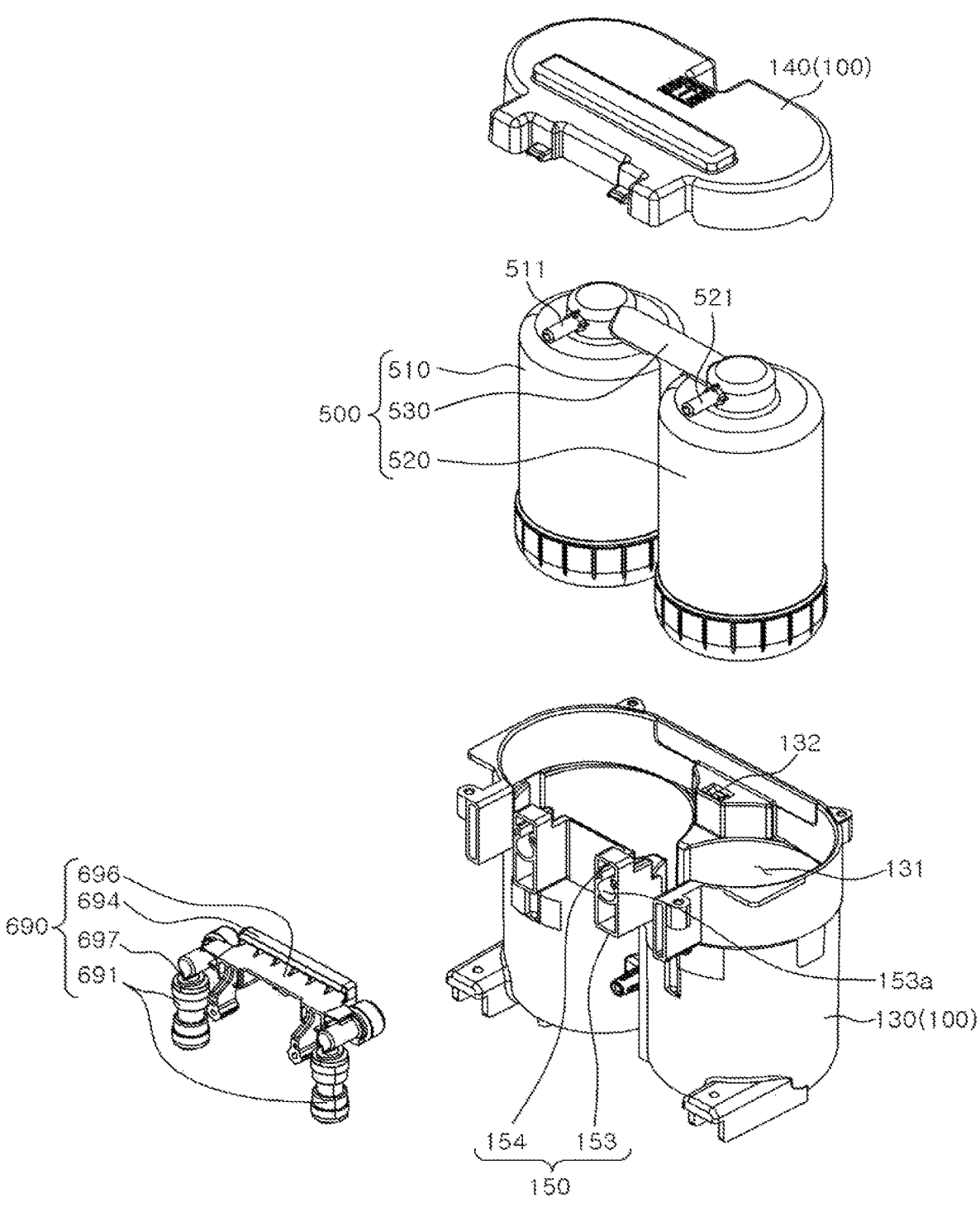
Figure 15:
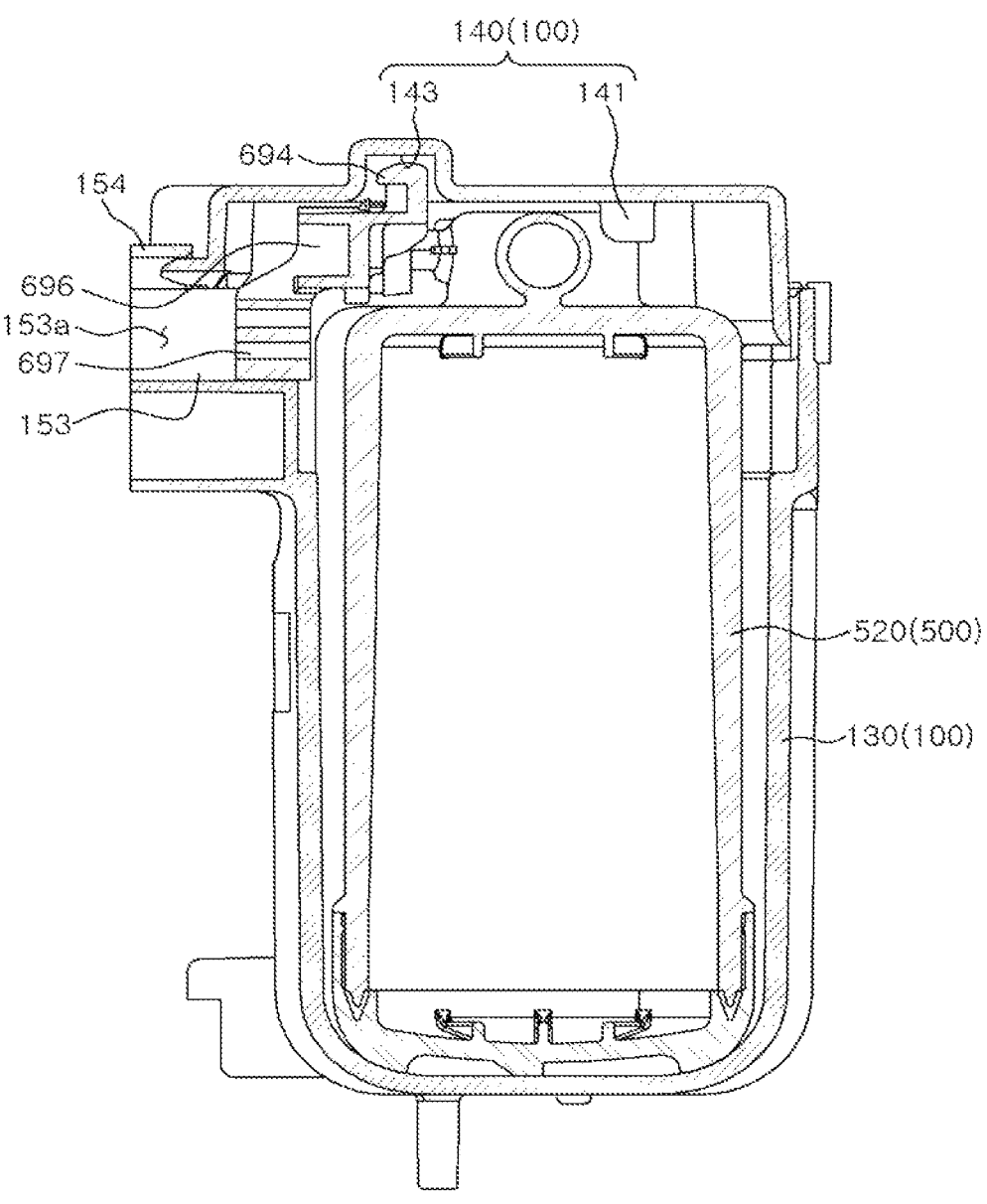
Figure 16:
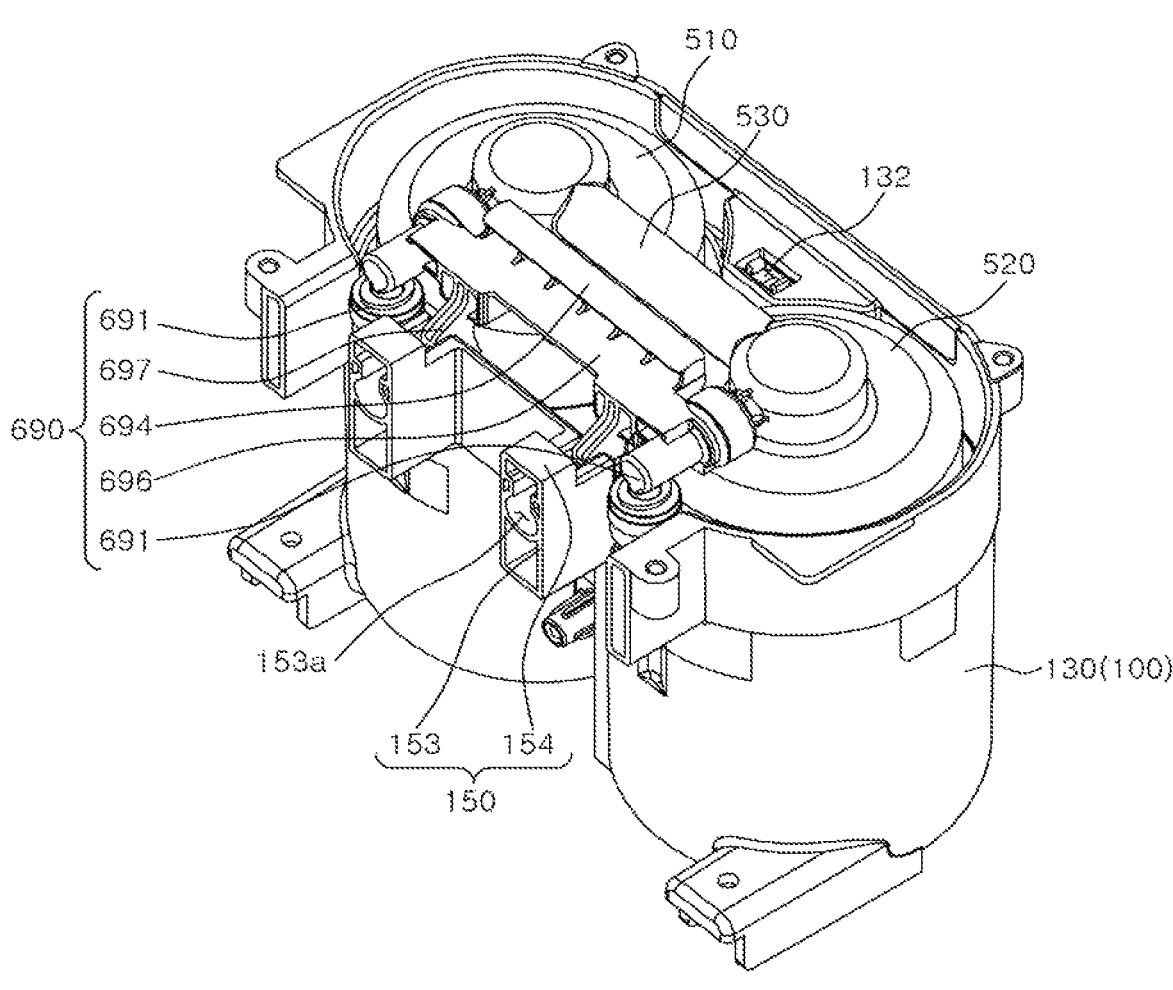
Figure 17:
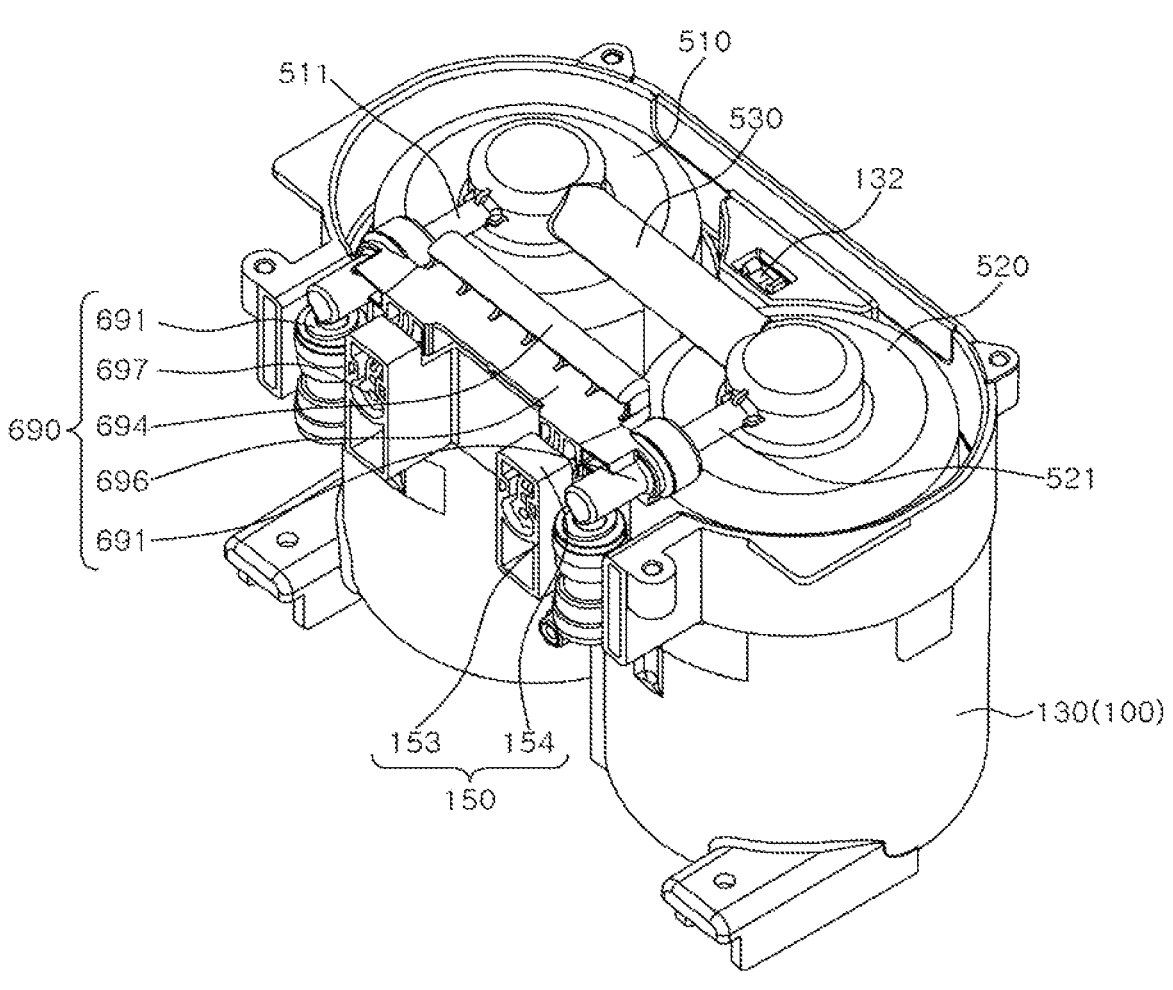
Figure 18:
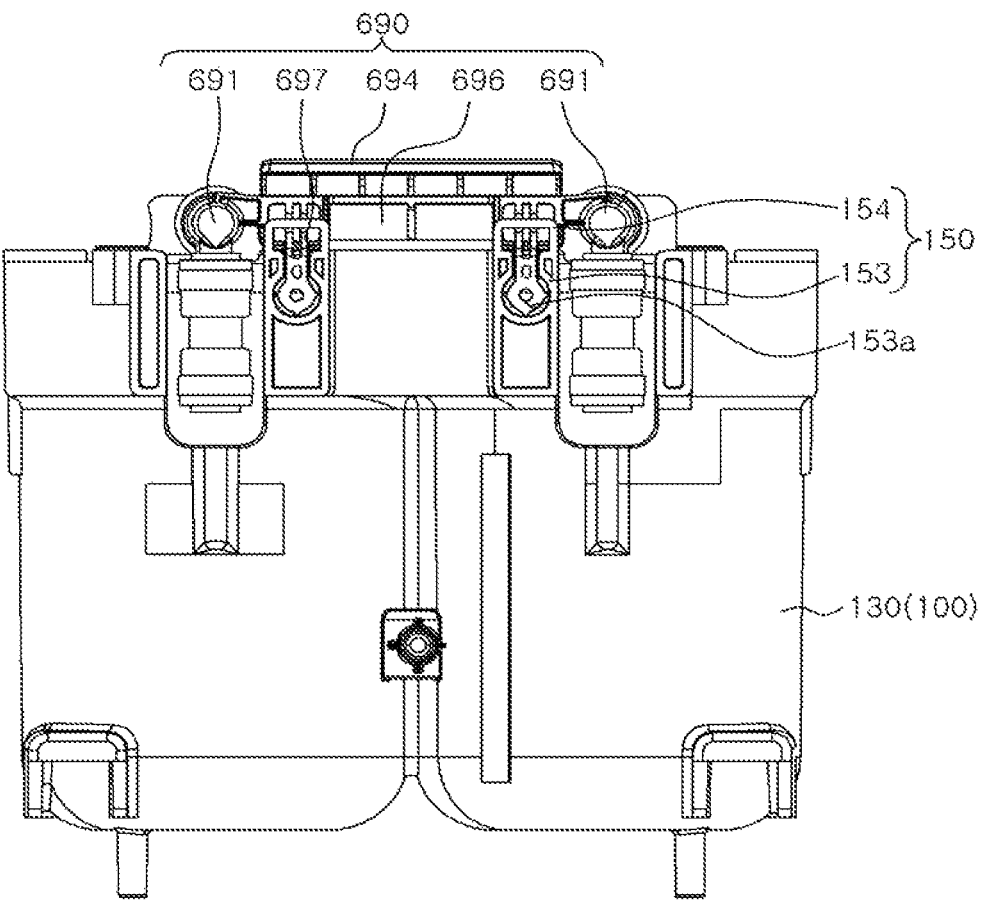

FIG. 5 is a perspective view of a filter housing accommodating a filter module of the water purifier according to the first embodiment of the present disclosure, a filter cap, a valve support, and a plurality of fitting valve modules.
FIG. 6 is an exploded perspective view of the filter housing, the filter module, the filter cap, and the fitting valve module of FIG. 5 which are disassembled.
FIG. 7 is a perspective view of a state in which a bottom surface of the filter cap of FIG. 5 is positioned in an upward direction.
FIG. 8 is a cross-sectional view taken along line VIII-VIII in FIG. 5.
FIG. 9 is a perspective view of a first fitting valve module of FIG. 7 in a separated state and a second fitting valve module in a coupled state.
FIG. 10 is a plan view of FIG. 9.
FIG. 11 is a perspective view of an exploded view of a flow path module of FIG. 3.
FIG. 12 is a perspective view showing a plurality of water pipes and tubing assemblies included in the flow path module of FIG. 3 being connected.
FIG. 13 is a perspective view of a filter housing accommodating a filter module, a filter cap, a valve support, and a fitting valve module, according to a second embodiment of the present disclosure, which are combined.
FIG. 14 is an exploded perspective view in which the filter housing, the filter module, the filter cap, and the fitting valve module shown in FIG. 13 are disassembled.
FIG. 15 is a cross-sectional view of the filter housing, the filter module, the filter cap, and the fitting valve module shown in FIG. 13.
FIG. 16 is a perspective view illustrating the fitting valve module of FIG. 13 in a coupled state.
FIG. 17 is a perspective view illustrating the fitting valve module of FIG. 13 in a separated state.
FIG. 18 is a plan view of FIG. 13.

BEST MODE FOR CARRYING OUT THE INVENTION

Hereinafter, a preferred embodiment of the present disclosure for implementing the spirit of the present disclosure will be described in more detail with reference to the accompanying drawings.

However, in describing the present disclosure, detailed descriptions of known configurations or functions may be omitted to clarify the present disclosure.

When an element is referred to as being 'connected' to, 'supported' by, 'supplied' to, or 'flowed' into another element, it should be understood that the element may be directly connected to, supported by, supplied to, or flowed into other element, but that other elements may exist in the middle.

The terms used in the present disclosure are only used for describing specific embodiments, and are not intended to limit the present disclosure. Singular expressions include plural expressions unless the context clearly indicates otherwise.

Figure 1:
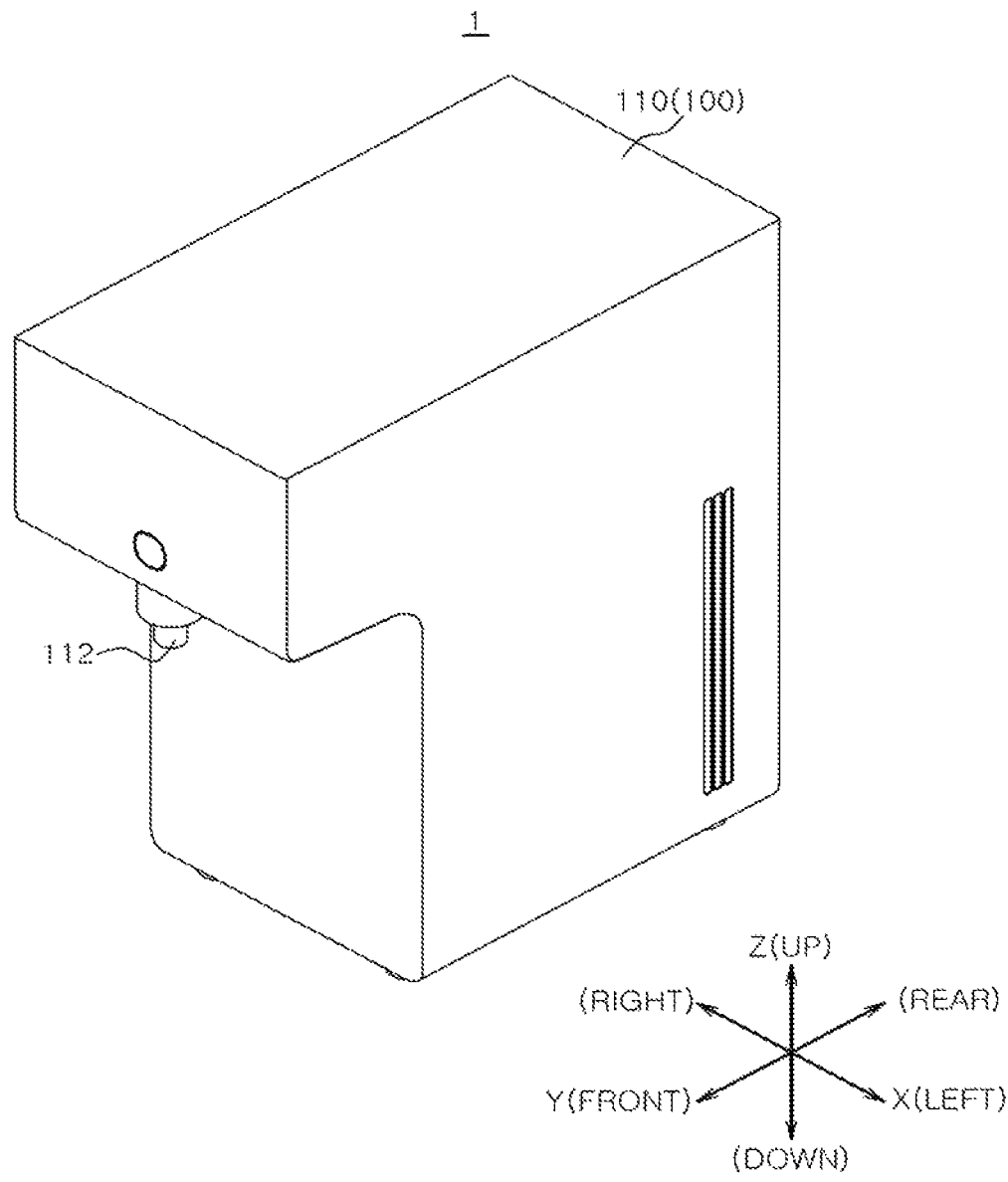
FIG. 1 is a perspective view of a water purifier according to a first embodiment of the present disclosure.

In addition, in the present specification, the front is a direction in which a fitting valve module 690, which will be described later, is separated from a filter module 500, and the rear is a direction in which the fitting valve module 690 approaches to the filter module 500 to be coupled to the filter module 500. In addition, it is noted in advance that expressions such as upward, downward, sideward, etc. are described based on the direction shown in FIG. 1 unless otherwise specified. Further, in the accompanying drawings, some components are exaggerated, omitted, or schematically illustrated, and the size of each component does not entirely reflect the actual size.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

Hereinafter, a specific configuration of a water purifier 1 according to a first embodiment of the present disclosure will be described with reference to the drawings.

Hereinafter, referring to FIGS. 1 to 4, the water purifier 1 according to the first embodiment of the present disclosure can provide clean water to users by filtering water supplied from the outside. For example, the water purifier 1 can receive water from a water supply source (not shown) such as tap water, and can filter the supplied water into clean water. The water purifier 1 may include a frame 100, a flow path module 200, a bracket 300, a separation prevention member 400, a filter module 500, a tubing assembly 600, a cooler 700, and a heater 800, a cold water flow unit 900, a NOS valve 1000, a circuit board 1100, and a tube (not shown).

Water introduced into the water purifier 1 from the outside may be classified into raw water, purified water, cold water, and hot water. Hereinafter, among water introduced into the water purifier 1 from the outside, water that has not passed through the filter 500 is defined as raw water, and water filtered through the filter 500 is defined as purified water. In addition, among the water filtered by the filter module 500, the water cooled to a predetermined temperature or less in the cooler 700 is defined as cold water and the water heated to a predetermined temperature or higher in the heater 800 is defined as hot water.

The frame 100 may provide a space in which the flow path module 200, the bracket 300, the separation prevention member 400, the filter module 500, the tubing assembly 600, the cooler 700, the heater 800, the cold water flow unit 900, the NOS valve 1000, and the circuit board 1100 are accommodated. For example, the frame 100 may extend in an up-down direction and may have a shape in which an upper part protrudes forward. The frame 100 may include a main frame 110, a cover frame 120, a filter housing 130, a filter cap 140, and a valve support 150.

Referring back to FIG. 2, the main frame 110 may be provided to surround at least a portion of the flow path module 200, the bracket 300, the separation prevention member 400, the filter module 500, the tubing assembly 600, the cooler 700, the heater 800, the cold water flow unit 900, the NOS valve 1000, and the circuit board 1100. For example, the main frame 110 may be formed by coupling a plurality of cover members to each other using bolts or the like. In addition, an upper cover of the main frame 110 may be selectively separated. However, this is only an example, and a well-known mean, other than bolts, for coupling a plurality of cover members to each other may be used, and a side cover or a bottom cover may be selectively separated.

In addition, the main frame 110 may be provided with an outlet 112 for discharging purified water to the outside. The outlet 112 may communicate with the tubing assembly 600 and may be configured to discharge purified water, cold water, and hot water flowing in the tubing assembly 600 to the outside. For example, the outlet 112 may be configured to discharge one of purified water, cold water, and hot water to the outside according to a user's selection. In addition, the outlet 112 may be provided on the front side of the main frame 110 and may be opened downward.

Referring again to FIGS. 2 and 3, the cover frame 120 may be supported by the bracket 300 to cover the flow path module 200 seated on the bracket 300. In addition, the cover frame 120 may be separated from the bracket 300 so that the flow path module 200 is exposed to the outside. In this case, the cover frame 120 may be fixedly supported by the main frame 110. However, this is only an example, and the cover frame 120 may be rotatably supported by the bracket 300 or the main frame 110. Further, the cover frame 120 may support the circuit board 1100 and wires connected to the circuit board 1100, and may be separated from the bracket 300 together with the circuit board 1100.

Figure 2:
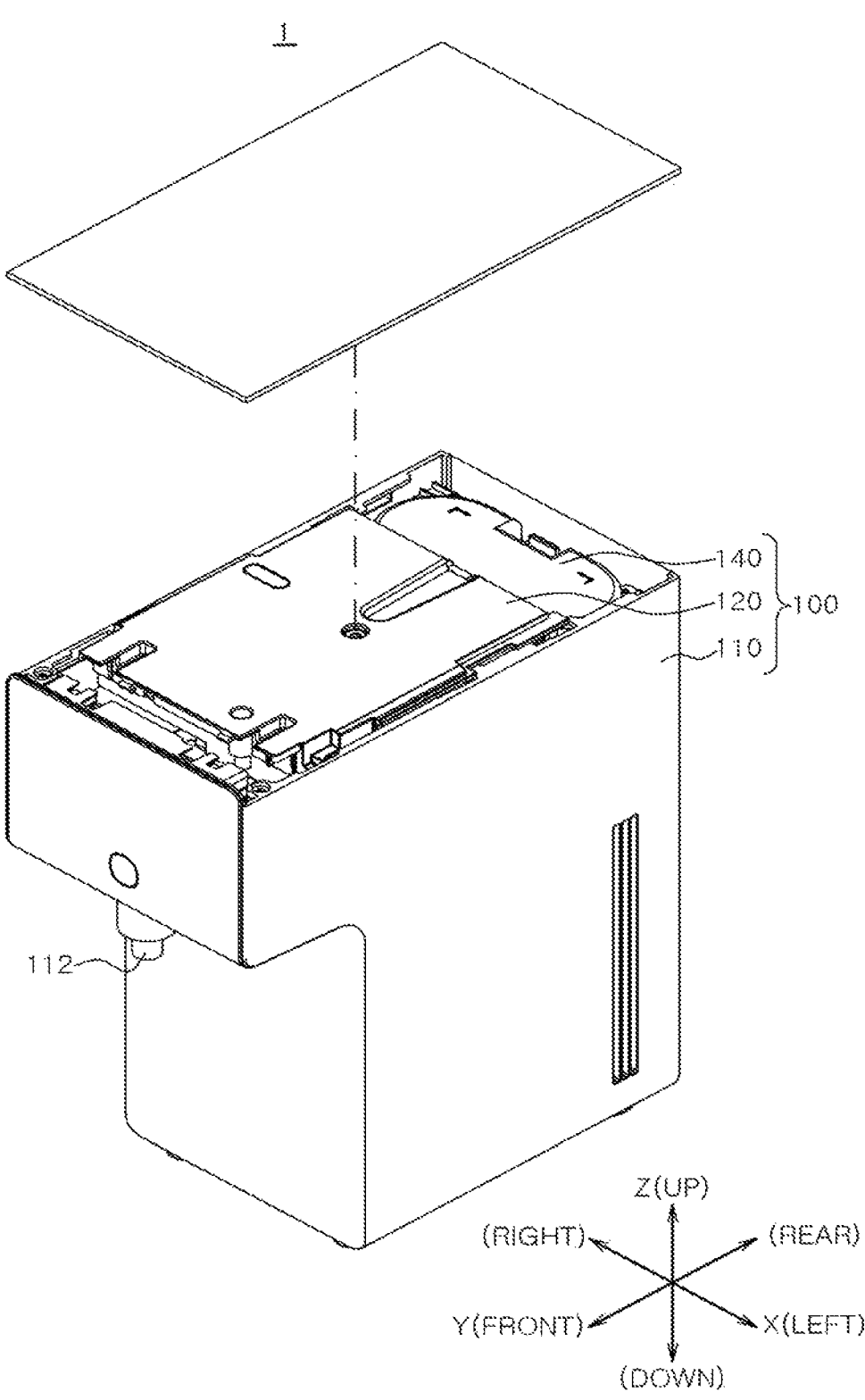
FIG. 2 is a perspective view of the water purifier of FIG. 1 with an upper cover removed.
Figure 3:
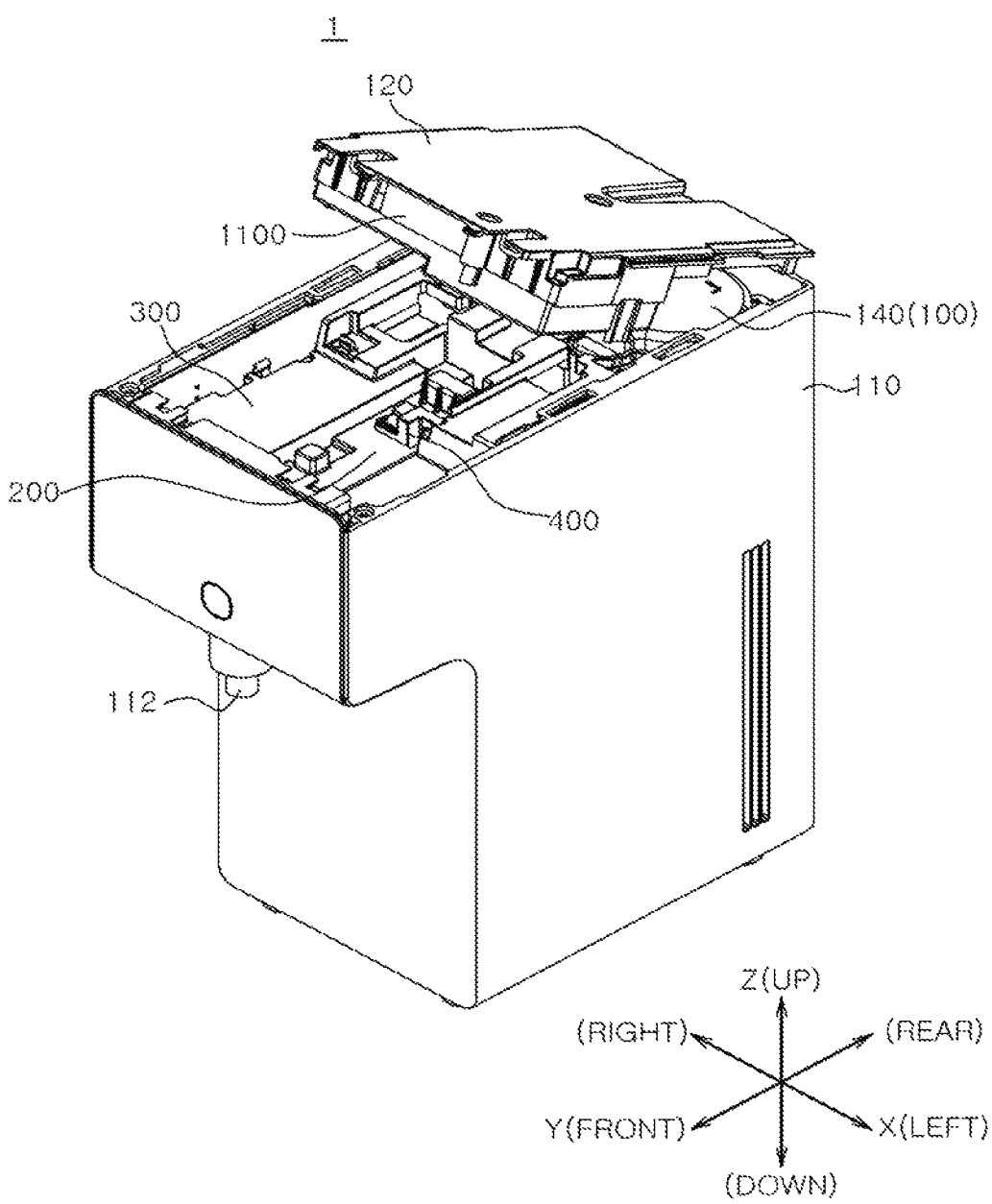
FIG. 3 is a perspective view of a state in which the cover frame of FIG. 2 is placed in an open fixed position.
Figure 4:
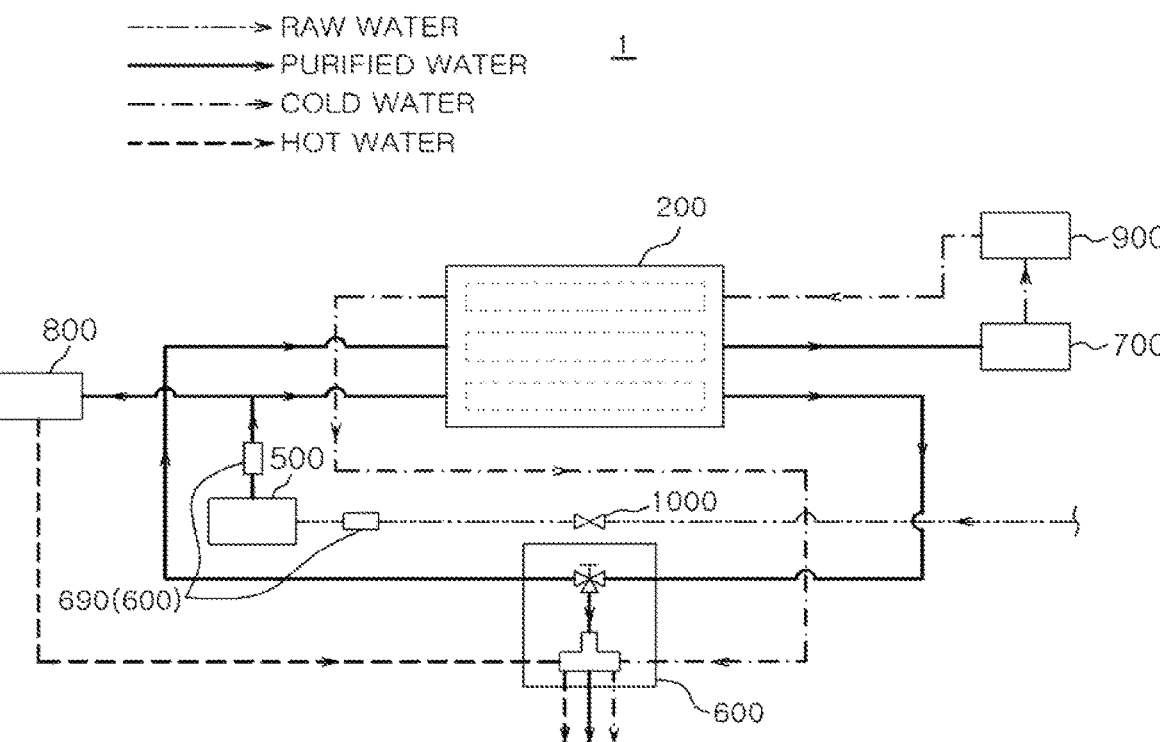
FIG. 4 is a conceptual diagram schematically illustrating a flow of water in the water purifier according to the first embodiment of the present disclosure.

The cover frame 120 may be selectively placed in any one of a cover position and an open fixed position. For example, as shown in FIG. 2, the cover frame 120 may be placed in the cover position. In this case, the cover frame 120 may be positioned above the bracket 300 and the flow path module 200, and may block the flow path module 200 from the outside. As another example, as shown in FIG. 3, the cover frame 120 may be configured to be shifted from the cover position so that the flow path module 200 is exposed to the outside. In other words, the cover frame 120 may be separated from the bracket 300, and the separated cover frame 120 may be placed in the open fixed position. In this case, upper sides of the bracket 300 and the flow path module 200 may be open to the outside, and the flow path module 200 may be separated from the bracket 300 to be replaced. In addition, the cover frame 120 placed in the open fixed position may be engaged and fixed to the main frame 110 in an inclined state with respect to the cover frame 120 in the cover position.

Further referring to FIGS. 5 and 6, the upper side of the filter housing 130 is open to accommodate the filter module 500. The filter housing 130 may be disposed inside the main frame 110 to be located at the rear of the water purifier 1. In addition, the filter housing 130 may be integrally formed with the main frame 110, but is not limited thereto. The filter housing 130 may be provided above the cooler 700, the cold water flow unit 900, and a fan unit for heat dissipation of the cooler 700, and may be disposed at the rear of the cover frame 120. In addition, the filter housing 130 may be exposed when the upper cover of the main frame 110 is removed. A filter module accommodating space 131, a fastening groove 132, and a residual water outlet 133 may be formed in the filter housing 130.

The filter module accommodating space 131 may accommodate the filter module 500. In addition, the filter module accommodating space 131 may be formed to contain residual water discharged from the filter module 500 when the filter module 500 is replaced. Due to the filter module accommodating space 131, it is possible to prevent residual water from falling onto electronic parts such as the cooler 700 and the fan unit, or into the cold water flow unit 900.

The fastening groove 132 may be detachably fastened to a fastener 142 of the filter cap 140. By fastening the fastening groove 132 and the fastener 142, the filter cap 140 can be prevented from being arbitrarily separated from the filter housing 130.

The residual water outlet 133 is an opening for discharging residual water contained in the filter module accommodating space 131 to the outside of the filter housing 130. The residual water outlet 133 may be provided at a lower portion of the filter housing 130.

Further referring to FIGS. 7 and 8, the filter cap 140 may be detachably fastened to the filter housing 130 to cover the upper side of the filter housing 130. As the filter cap 140 is separated, the upper side of the filter housing 130 is opened, and the filter module 500 can also be shifted upward through the open upper side of the filter housing 130 to be replaced. In addition, the filter cap 140 may be configured to interfere with a handle 694 of the fitting valve module 690 so that it is not fastened to the filter housing 130 when the fitting valve module 690 is in the separated state. Accordingly, when the filter cap 140 and the filter housing 130 are not fastened, the user may recognize that the fitting valve module 690 is not properly coupled to the filter module 500. In addition, a seating rib 141, a fastener 142, a handle accommodating portion 143, and a movement prevention rib 144 may be formed in the filter cap 140.

The seating rib 141 may protrude downward to surround circumferential surfaces of supporting portions of filter mouths 511 and 521 of respective filters 510 and 520 inside the filter cap 140. When the filter cap 140 is incorrectly fastened to the filter housing 130, the filter module 500 interferes with the seating rib 141, so the user can easily recognize that the filter cap 140 is incorrectly fastened.

The fastener 142 may be inserted into the fastening groove 132 of the filter housing 130. In addition, the fastener 142 may be detached from the fastening groove 132 so that the filter cap 140 can be separated from the filter housing 130.

The handle accommodating portion 143 is formed inside the filter cap 140, and when the fitting valve module 690 to be described later is in the coupled state in which the fitting valve module 690 is coupled to the filter module 500, the handle accommodating portion 143 can accommodate the handle 694 of the fitting valve module 690.

The movement preventing rib 144 may protrude from the handle accommodating portion 143. In addition, the movement preventing rib 144 may be disposed farther from the filter module 500 than the handle 694 when the fitting valve module 690 is in the coupled state. The movement preventing rib 144 may prevent the handle 694 from being arbitrarily moved in a direction away from the filter module 500 when the fitting valve module 690 is in the coupled state.

Further referring to FIGS. 9 and 10, the valve support 150 may support one or more fitting valve modules 690 and guide the movement thereof. By the valve support 150, the fitting valve module 690 may be moved in a direction toward the filter module 500 or in a direction away from the filter module 500. In addition, the valve support 150 and the fitting valve module 690 may be engaged with each other with a gap (assembly tolerance) formed therebetween. When the fitting valve module 690 is manipulated and moved while being engaged with the valve support 150 by an applied external force, a posture of the fitting valve module 690 during the movement may be tilted compared to a posture when no external force is applied. The valve support 150 may include a guide member 151 and a guide cover 152.

The guide member 151 may extend in a predetermined direction to guide the movement of the fitting valve module 690. For example, the guide member 151 may extend in a direction away from the filter module 500. The guide member 151 and the fitting valve module 690 may be engaged with each other with a gap formed on one side. In addition, the guide member 151 may include a plurality of guide members 151 disposed on both sides of the fitting valve module 690. The guide member 151 may include a guide connection portion 151a and a guide portion 151b.

The guide connection portion 151a may be connected to an outer surface of the filter housing 130 and may protrude forward from the filter housing 130. In addition, the guide connection portion 151a may support the guide portion 151b.

The guide portion 151b may extend from the guide connection portion 151a in a direction (rearward) toward the fitting valve module 690. In addition, the guide portion 151b and the guide connection portion 151a may form a guide groove 151b-1.

The guide groove 151b-1 has a downwardly recessed shape and may extend along a movement direction (front-rear direction) of the fitting valve module 690. In addition, the guide groove 151b-1 and a guide follower 692 to be described later may be engaged with each other with a gap formed therebetween.

The guide cover 152 is disposed above the plurality of guide members 151 to prevent the fitting valve module 690 from being separated from the valve support 150. In other words, the guide cover 152 may be engaged with the fitting valve module 690 when the fitting valve module 690 is in the separated state in which the fitting valve module 690 is separated from the filter module 500. The guide cover 152 may include a guide cover body 152a, a first protrusion 152b, and a second protrusion 152c.

The guide cover body 152a may be positioned above the fitting valve module 690 to cover the upper side of the guide groove 151b-1.

The first protrusion 152b may protrude downward from the guide cover body 152a and may be disposed above the valve support 150. In addition, the first protrusion 152b may be positioned above the guide follower 692 to be described later from the guide cover body 152a when the fitting valve module 690 is in the separated state. The first protrusion 152b may guide both sides of an upper portion of the fitting valve module 690.

The second protrusion 152c may protrude from the guide cover body 152a in a direction (rearward) toward the filter module 500. In addition, the second protrusion 152c may be engaged with an insertion hole 694a formed in the handle 694 of the fitting valve module 690 when the fitting valve module 690 is in the separated state. Since the second protrusion 162 is inserted into the insertion hole 694a, when the fitting valve module 690 is in the separated state, the fitting valve module 690 can be prevented from tilting in the left-right direction. In other words, the second protrusion 152c can prevent the fitting valve module 690 from tilting and interfering with a user who works the replacement of the filter module 500.

Further referring to FIGS. 11 and 12, the flow path module 200 may provide a passage through which purified water and cold water flow. The flow path module 200 can communicate with the tubing assembly 600 and is detachably connected to the tubing assembly 600. For example, when the flow path module 200 is connected to the tubing assembly 600, purified water and cold water may flow between the flow path module 200 and the tubing assembly 600. In addition, when the flow path module 200 is connected to the tubing assembly 600, purified water may be supplied from the filter module 500 through the tubing assembly 600. The flow path module 200 may be indirectly connected to the filter module 500 through the tubing assembly 600 without being directly connected to the filter module 500. In other words, the flow path module 200 may be seated on a seating portion 310 of the bracket 300, which will be described later, and may be connected to the tubing assembly 600 when the flow path module 200 is seated in a correct position. The correct position of the flow path module 200 means a position where the flow path module 200 is placed in a preset orientation and is seated to match the seating portion 310. When the flow path module 200 is not seated in the correct position, that is, when the flow path module 200 is placed in an orientation different from the preset orientation or is not aligned with the seating portion 310, the flow path module 200 interferes with the bracket 300 and is not connected to the tubing assembly 600.

The flow path module 200 is configured to be able to communicate with the tubing assembly 600 when the flow path module 200 is seated in the correct position, so that the user can easily connect the flow path module 200 and the tubing assembly 600. In other words, when the user mounts the flow path module 200 in the correct position with respect to the bracket 300, the flow path module 200 and the tubing assembly 600 can be connected without any separate connecting component. When viewed from above, at least a portion of the flow path module 200 may overlap the tubing assembly 600. In addition, when viewed from above, the flow path module 200 may be disposed between the filter module 500 and the outlet 112 so as not to overlap with the filter module 500. Further, when seated in the correct position, the flow path module 200 may be placed higher than a temperature control unit. In the present specification, it may be understood that the temperature control unit may include a cooler 700, a heater 800, and a cold water flow unit 900. Furthermore, the flow path module 200 may include a plurality of water pipes 222, 221, and 223.

The plurality of water pipes 222, 221, and 223 are connected to the tubing assembly 600 and may provide a flow space through which purified water or cold water flows. The plurality of water pipes 222, 221, and 223 may be separated from the tubing assembly 600 when the flow path module 200 seated on the seating portion 310 is separated from the bracket 300. In other words, since the user can separate the plurality of water pipes 222, 221, and 223 and the tubing assembly 600 by separating the flow path module 200 from the bracket 300, the plurality of water pipes 222, 221, and 223 can be replaced at once.

The bracket 300 may support the flow path module 200 and may provide a portion on which the flow path module 200 is seated. The bracket 300 may be supported on the main frame 110 and may be disposed above the tubing assembly 600.

The separation preventing member 400 may prevent the flow path module 200 seated in the correct position with respect to the seating portion 310 from being separated from the bracket 300. For example, the flow path module 200 seated in the correct position is connected to the tubing assembly 600, and water may flow between the flow path module 200 and the tubing assembly 600. If the flow path module 200 is separated from the seating portion 310 while water flows between the flow path module 200 and the tubing assembly 600, water may leak between the flow path module 200 and the tubing assembly 600. The separation preventing member 400 may prevent the flow path module 200 from being separated from the seating portion 310 so that the connection between the flow path module 200 and the tubing assembly 600 is maintained without being disconnected.

In addition, the separation preventing member 400 may be configured such that one end is supported by the bracket 300 and the other end selectively interferes with an upper side of the flow path module 200 seated in the correct position. For example, one end of the separation preventing member 400 may be rotatably supported by the bracket 300, and the other end rotates to the upper side of the flow path module 200 seated in the correct position so that the body part 210 is prevented from being separated from the seating portion 310. When the separation prevention member 400 is placed at the upper side of the flow path module 200 to prevent the separation of the flow path module 200, the separation prevention member 400 allows the cover frame 120 to be placed in the cover position. For example, when the separation preventing member 400 is disposed at the upper side of the flow path module 200, the cover frame 120 can be rotated and placed in the cover position.

In addition, when the other end of the separation prevention member 400 is not placed at the upper side of the flow path module 200 and allows the flow path module 200 to be separated from the seating portion 310, the separation prevention member 400 may interfere with the cover frame 120 to prevent the cover frame 120 from being placed in the cover position. For example, when the separation preventing member 400 rotates and the flow path module 200 can be separated from the seating portion 310, the cover frame 120 is caught by the separation preventing member 400 without being placed in the cover position.

When the flow path module 200 is separable from the bracket 300, the separation preventing member 400 prevents the cover frame 120 from being placed in the cover position, so that the user recognizes that the flow path module 200 is detachable. In this way, the user can confirm once again whether the separation preventing member 400 is not engaged with the flow path module 200. In addition, the connection between the flow path module 200 and the tubing assembly 600 can be maintained by the separation prevention member 400 preventing the separation of the flow path module 200 seated in the correction position. Due to this, it is possible to prevent water leakage between the flow path module 200 and the tubing assembly 600 connected to each other.

Referring back to FIG. 6, the filter module 500 may filter raw water introduced into the water purifier 1 into purified water. In addition, the fitting valve module 690 may be coupled to the filter module 500 so that raw water may be provided through the fitting valve module 690 or purified water may be provided to the fitting valve module 690. The filter module 500 may be provided in the frame 100 to be replaceable. For example, the filter module 500 may be disposed at a rear side of the water purifier 1. The filter module 500 may include a first filter 510, a second filter 520, and a filter connection unit 530.

The first filter 510 may receive raw water from the fitting valve module 690. The first filter 510 may be provided with a first filter mouth 511 that can be selectively coupled to a first fitting valve module 690-1, to be described later, for providing raw water. In other words, raw water may flow into the first filter mouth 511.

The second filter 520 may provide purified water to the fitting valve module 690. The second filter 520 may be provided with a second filter mouth 521 that can be selectively coupled to a second fitting valve module 690-2, to be described later, for receiving purified water. In other words, purified water may be discharged from the second filter mouth 512.

The filter connection unit 530 may be connected to the first filter 510 and the second filter 520. In addition, a flow passage may be provided inside the filter connection unit

530 so that at least one of raw water and purified water communicates between the first filter 510 and the second filter 520. By gripping the filter connection unit 530 and lifting it upward, the user can take out the first filter 510 and the second filter 520 at once from the filter housing 130.

Referring to FIG. 5, the tubing assembly 600 may connect one or more of the outlet 112, the filter module 500, the cooler 700, and the cold water flow unit 900 to the flow path module 200. The purified water filtered by the filter module 500 may flow into the flow path module 200 through the tubing assembly 600. As another example, cold water cooled in the cold water flow unit 900 may flow into the flow path module 200 through the tubing assembly 600. In addition, the tubing assembly 600 may connect some of the plurality of water pipes 222, 221, and 223 of the flow path module 200. The tubing assembly 600 may provide a passage through which water flows. For example, one or more of raw water, purified water, cold water, and hot water may flow through the tubing assembly 600.

The tubing assembly 600 may be disposed below the bracket 300 and may be selectively connected to the flow path module 200 seated on the bracket 300. In addition, when the tubing assembly 600 is connected to the flow path module 200, it may communicate with the plurality of water pipes 222, 221, and 223. In this case, the tubing assembly 600 may form a water flow path together with the flow path module 200. For example, purified water and cold water may flow along a water flow path between the tubing assembly 600 and the flow path module 200 and alternately flow between the tubing assembly 600 and the flow path module 200. The tubing assembly 600 may include the fitting valve module 690.

Referring to FIGS. 5, 6, 8, and 9 again, the fitting valve module 690 may be detachably fastened to the filter module 500 to provide at least one of a flow channel for the flow of raw water supplied to the filter module 500 and a flow channel for the flow of purified water discharged from the filter module 500. In addition, the fitting valve module 690 may be moved while being supported by the valve support 150, and may be selectively placed in the coupled state or the separated state with respect to the valve support 150. In other words, the fitting valve module 690 may be moved in a direction (rearward) toward the filter module 500 and placed in the coupled state, or moved in a direction (forward) away from the filter module 500 and placed in the separated state. The user can easily replace the filter module 500 by moving the fitting valve module 690 to the separated state or the coupled state. The distance between the filter housing 130 and the filter module 500 in the moving direction of the fitting valve module 690 may be smaller than the moving distance of the fitting valve module 690. In other words, the distance between the filter housing 130 and the filter module 500 in the moving direction of the fitting valve module 690 may be smaller than the maximum separation distance between the handle 694 of the fitting valve module 690 and the guide member 151 in the moving direction of the fitting valve module 690, and the distance between the filter housing 130 and the filter module 500 in the moving direction of the fitting valve module 690 may be a gap between the filter housing 130 and the filter module 500 on the side of the fitting valve module 690 in a state where the filter module 500 is accommodated in the filter housing 130.

In addition, the fitting valve module 690 and the valve support 150 may be engaged with each other with a gap formed therebetween. Due to the gap, the fitting valve module 690 can be moved in a posture tilted at a predetermined angle. The predetermined angle may be an angle formed between the posture in which the fitting valve module 690 is tilted forward or backward by receiving an external force and a posture in which the fitting valve module 690 is not tilted by receiving no external force. In addition, the fitting valve module 690 may include a plurality of fitting valve modules 690. The plurality of fitting valve modules 690 may include a first fitting valve module 690-1 and a second fitting valve module 690-2.

The first fitting valve module 690-1 may be coupled to the first filter mouth 511 of the first filter 510. In addition, the first fitting valve module 690-1 may receive raw water flowing from the NOS valve 1000 and provide it to the first filter 510. Further, the first fitting valve module 690-1 and the second fitting valve module 690-2 may be placed in different positions. For example, as shown in FIG. 9, the first fitting valve module 690-1 may be placed in the separated state, and the second fitting valve module 690-2 may be placed in the coupled state.

The second fitting valve module 690-2 may be coupled to the second filter mouth 521 of the second filter 520 to provide purified water. The purified water may flow to the flow path module 200 through the second fitting valve module 690-2. By moving the first fitting valve module 690-1 and the second fitting valve module 690-2 in the separated state, the user can replace the first filter 510 and the second filter 520.

Referring further to FIG. 10, each of the plurality of fitting valve modules 690 may include a fitting valve 691, a guide follower 692, a locking part 693, a handle 694 and a valve hook 695.

The fitting valve 691 may provide a flow path through which purified water or raw water flows. Further, the fitting valve 691 may be selectively engaged with the filter module 500. A first connector 691a that can be fastened to the filter module 500 and a second connector 691b connected to a tube may be formed in the fitting valve 691. The first connector 691a may be positioned above the second connector 691b. Raw water may flow in an upward direction inside the fitting valve 691 and purified water may flow in a downward direction inside the fitting valve 691 through the first connector 691a and the second connector 691b.

The guide follower 692 may extend from the fitting valve 691 in a direction closer to the guide part 151b. The guide follower 692 may be engaged with the guide groove 151b-1 with a gap formed therebetween. In other words, the end of the guide follower 692 may be wrapped around the guide groove 151b-1. In addition, the guide follower 692 and the guide groove 151b-1 may contact each other when the fitting valve module 690 is moved and tilted.

When the fitting valve module 690 is moved, the locking portion 693 may prevent the posture of the fitting valve module 690 from tilting beyond a predetermined angle. The locking part 693 may protrude from the fitting valve 691 in a direction closer to the guide connection portion 151a. In addition, the locking part 693 may be located lower than the guide part 151b. When the fitting valve module 690 is moved, the locking part 693 comes into contact with the guide part 151b to prevent the posture of the fitting valve module 690 from exceeding the predetermined angle.

Referring back to FIG. 9, the handle 694 may protrude upward from the fitting valve 691. Using the handle 694, the user can place the fitting valve module 690 in the separated or the coupled state. In addition, an insertion hole 694a into which the second protrusion 152c is inserted may be formed in the handle 694. Due to the insertion hole 694a, the handle 694 can be supported by the second protrusion 152c when the fitting valve module 690 is in the separated state. In addition, the handle 694 is accommodated in the handle accommodating portion 143 when the filtering valve module 690 is in the coupled state, and is prevented from being moved in a direction away from the filter module 500 by the movement preventing rib 144.

The valve hook 695 may be caught on the valve support 150 when the fitting valve module 690 is placed in a predetermined position in the separated state. In addition, the valve hook 695 may protrude from the fitting valve 691 in a direction closer to the guide member 151. In other words, the valve hook 695 may be caught on the end of the guide member 151 at the predetermined position. The predetermined position may mean a position (maximum separation position) at which the fitting valve module 690 is maximally spaced from the filter module 500 and comes in contact with the guide cover 152. The valve hook 695 can prevent the fitting valve module 690 from being arbitrarily moved in a direction (rearward) toward the filter module 500 from the predetermined position. In addition, the valve hook 695 may be elastically deformed. The valve hook 695 may be, for example, elastically compressed when the fitting valve module 690 is placed between the coupled state and the predetermined position, and may be elastically restored in a direction (forward) away from the fitting valve 691 when placed at the predetermined position to be in contact with the end of the guide member 151.

Referring back to FIG. 4, the cooler 700 may provide cold water by cooling purified water to a predetermined temperature or less. The cooler 700 may be disposed above the cold water flow unit 900, and the cold water discharged from the cooler 700 may flow to the cold water flow unit 900.

The heater 800 may provide hot water by heating purified water to a predetermined temperature or higher. The hot water discharged from the heater 800 may flow into the tubing assembly 600.

The cold water flow unit 900 may provide a space through which the cold water supplied from the cooler 700 flows. In addition, the cold water flow unit 900 may provide a space for storing the cold water cooled by the cooler 700. For example, the cold water flow unit 900 may be configured in the form of a water tank to provide a space in which cold water flows and a space in which cold water is stored. In addition, as another example, the cold water flow unit 900 may be configured in the form of a thin pipe or a water tank with a partition wall installed therein to provide a space in which purified water flows as soon as it is cooled.

The NOS valve 1000 may be operated to control a flow rate of raw water introduced from the outside. For example, the NOS valve 1000 may be a valve capable of selectively opening and closing a raw water flow path which guides raw water to the filter module 500, and may control the flow rate of raw water by opening and closing a passage through which raw water flows. In other words, the NOS valve 1000 may be disposed at an upstream side of the filter module 500. The driving of the NOS valve 1000 may be controlled by the circuit board 1100. In addition, the NOS valve 1000 may guide raw water to the fitting valve module 690. The NOS valve 1000 may be disposed at a position adjacent to the tubing assembly 600.

Referring back to FIG. 3, the circuit board 1100 may control the operation of the tubing assembly 600. For example, the circuit board 1100 may control the NOS valve 1000 to open the passage through which raw water flows. In addition, the circuit board 1100 may control the NOS valve 1000 to close the raw water flow path to block the supply of raw water to the fitting valve module 690 when the fitting valve module 690 is separated from the coupled state. The circuit board 1100 may include a plurality of boards and a plurality of wires, and may be fixedly supported on the cover frame 120. Accordingly, the circuit board 1100 may rotate together with the cover frame 120 when the cover frame 120 is rotated to be separated from the bracket 300. The circuit board 1100 can be easily exposed to the outside by being separated together with the cover frame 120. In addition, since the circuit board 1100 is fixedly supported on the main frame 110 while being separated together with the cover frame 120, the maintenance of the circuit board 1100 can be easily performed. The circuit board 1100 may be implemented by an arithmetic device including a microprocessor, a measurement device such as a sensor, and a memory, and since the implementation method is obvious to those skilled in the art, further detailed descriptions thereof will be omitted.

The tube (not shown) may be coupled to the fitting valve module 690 so as to be bent when the fitting valve module 690 is separated from the coupled state. For example, the tube may be formed as a soft tube like rubber to be bendable, but is not limited thereto, and may be formed as a hard tube like ceramic to be bendable. The tube may provide raw water supplied from the NOS valve 1000 to the fitting valve module 690 or receive purified water discharged from the fitting valve module 690. In other words, the tube may be connected to the second connector 691b.

Hereinafter, the operation and effect of the water purifier 1 according to the first embodiment of the present disclosure will be described.

A user can use the water purifier 1 according to one embodiment of the present disclosure to filter water supplied from the outside. The water purifier 1 can provide purified water to the user by filtering raw water. In addition, the water purifier 1 can provide cold water or hot water to the user by cooling or heating the purified water according to the user's selection.

In addition, since the fitting valve module 690 is movable with respect to the valve support 150 so that it can be placed in the separated state or the coupled state, the user can easily replace the filter module 500. In addition, when the upper cover of the frame 100 and the filter cap 140 are separated in the upward direction and the fitting valve module 690 is in the separated state, the filter module 500 can be moved upward and replaced. Accordingly, even when the interval between the main frame 100 and the filter module 500 is narrow, the filter module 500 can be easily replaced.

In addition, when the fitting valve module 690 is in the predetermined position in the separated state, the movement of the fitting valve module 690 can be restricted by at least one of the guide cover 152 and the valve hook 695, so that the user can replace the filter module 500 without being hindered by the fitting valve module 690. In addition, since the filter cap 140 is configured to interfere with the handle 694 when the fitting valve module 690 is in the separated state, the user can recognize that the fitting valve module 690 is not properly fastened to the filter module 500.

Hereinafter, a water purifier 1 according to a second embodiment of the present disclosure will be described with reference to FIGS. 13 to 18. In describing the second embodiment of the present disclosure, the guide member 151 and the guide cover 152 of the first embodiment described above are referred to as a first guide member and a first guide cover, respectively. In addition, in describing the second embodiment of the present disclosure, when compared to the above-described first embodiment, there is a difference in the configurations of the valve support 150 and the fitting valve module 690. Accordingly, hereinafter, these differences will be mainly described, and the same description and reference numerals as those in the above-described embodiments will be referred to.

Referring to FIGS. 13 to 15, the valve support 150 may include a second guide member 153 and a second guide cover 154.

The second guide member 153 may extend in a direction away from the filter housing 130 to guide the movement of the fitting valve module 690. In addition, a rail portion 697 of the fitting valve module 690 may be inserted into and engaged with the second guide member 153. A rail groove 153a having a shape corresponding to at least a part of an outer shape of the rail portion 697 may be formed in the second guide member 153. Further, the second guide member 153 may be disposed between the plurality of fitting valves 691, and a multiple number of second guide member 153 may be provided to correspond to the number of rail portions 697.

The second guide cover 154 may be connected to the second guide member 153 to cover the front of the upper side of the rail groove 153a. The second guide cover 154 comes into contact with the rail portion 697 to prevent the rail portion 697 from moving in a direction away from the filter module 500 when the fitting valve module 690 is in the predetermined position in the separated state.

The fitting valve module 690 may include a plurality of fitting valves 691, the handle 694, a valve connection portion 696, and the rail portion 697.

The plurality of fitting valves 691 may include a first fitting valve 691-1 and a second fitting valve 691-2.

The first fitting valve 691-1 may be detachably coupled to the first filter mouth 511. In other words, when the fitting valve module 690 is in the coupled state, the first fitting valve 691-1 may provide raw water to the first filter 510. In addition, the first fitting valve 691-1 may receive raw water from the NOS valve 1000 through a tube.

The second fitting valve 691-2 may be detachably coupled to the second filter mouth 511. In other words, when the fitting valve module 690 is in the separated state, the second fitting valve 691-2 may receive purified water from the second filter 520. Further, the second fitting valve 691-2 may discharge purified water into the tube.

In addition, the first fitting valve 691-1 and the second fitting valve 691-2 may be moved simultaneously. For example, as shown in FIG. 16, when the fitting valve module 690 is placed in the coupled state, the first fitting valve 691-1 and the second fitting valve 691-2 can be simultaneously connected to the filter module 500. Further, as shown in FIG. 17, when the fitting valve module 690 is placed in the separated state, the first fitting valve 691-1 and the second fitting valve 691-2 can be simultaneously separated from the filter module 500.

The handle 694 may protrude upward from the valve connection portion 696. Through the handle 694, the user can move the fitting valve module 690 into the coupled state or the separated state.

The valve connection portion 696 may extend in a horizontal direction to be connected to the first fitting valve 691-1 and the second fitting valve 691-2. The first fitting valve 691-1 and the second fitting valve 691-2 can be moved simultaneously by the valve connection portion 696.

Referring further to FIG. 18, the rail portion 697 of the fitting valve module 690 may be supported and moved by the second guide member 153 of the valve support 150. The rail portion 697 may extend from the valve connection portion 696 in a direction toward the second guide member 153 and be engaged with the second guide member 153. In other words, one side of the rail portion 697 may be connected to the valve connection unit 696 and the other side opposite to the one side may be engaged with the rail groove 153a. The other side of the rail portion 697 may be surrounded by the rail groove 153a. The other side of the rail portion 697 may be prevented from moving upward by the rail groove 153a. In addition, the rail portion 697 may be disposed between the plurality of fitting valves 691 and a plurality of rail portions 697 may be formed.

Hereinafter, the operation and effect of the water purifier 1 according to the second embodiment of the present disclosure will be described.

According to the water purifier 1 according to the second embodiment, since the user can move the plurality of fitting valves 691-1 and 691-2 simultaneously, the fitting valve module 690 can be easily moved into the coupled state or the separated state, and the filters 510 and 520 can be replaced more easily.

Although the embodiments of the present disclosure have been described as specific embodiments, these are merely examples. The present disclosure is not limited to the above, and should be interpreted as having the widest scope according to the technical idea disclosed in the present specification. Those skilled in the art may combine/substitute the disclosed embodiments to implement a pattern of a shape not disclosed, but this also does not depart from the scope of the present disclosure. In addition, those skilled in the art may easily change or modify the disclosed embodiments based on the present specification, and it is clear that such changes or modifications also fall within the scope of the present disclosure.

What is claimed is:

1. A water purifier comprising:
a filter module for providing purified water by filtering raw water;
a fitting valve module detachably fastened to the filter module to provide at least one of a flow path for a flow of raw water supplied to the filter module and a flow path for a flow of the purified water discharged from the filter module; and
a frame including a valve support for movably supporting the fitting valve module to be movable,
wherein the fitting valve module is selectively placed in a separated state in which the fitting valve module is separated from the filter module by moving in a direction away from the filter module, or a coupled state in which the fitting valve module coupled to the filter module by moving toward the filter module.

2. The water purifier of claim 1, wherein the frame includes:
a filter housing having an open upper side and accommodating the filter module therein; and
a filter cap fastened to the filter housing to cover the upper side of the filter housing, and
wherein the valve support is supported on the filter housing.

3. The water purifier of claim 2, wherein the valve support includes a guide member extending in a predetermined direction to guide movement of the fitting valve module, and
wherein the fitting valve module includes:
a guide follower having a shape engaged with the guide member to be movable along the guide member; and
a locking portion for preventing a posture of the fitting valve module from being tilted beyond a predetermined angle when the fitting valve module is moved.

4. The water purifier of claim 3, wherein the fitting valve module and the valve support are engaged with each other with a gap formed therebetween.

5. The water purifier of claim 3, wherein the fitting valve module further includes:

a fitting valve selectively engaged with the filter module; and a handle having a shape protruding upward from the fitting valve, wherein the filter cap has a handle accommodating portion for accommodating the handle when the fitting valve module is in the coupled state, and wherein the filter cap is configured to interfere with the handle so that the fitting valve module is not fastened to the filter housing when the fitting valve module is in the separated state.

6. The water purifier of claim 2, wherein the filter module includes a first filter mouth for introducing the raw water and a second filter mouth for discharging the purified water, and wherein the fitting valve module includes:

a first fitting valve detachably coupled to the first filter mouth;

a second fitting valve detachably coupled to the second filter mouth; and a valve connection portion connecting the first fitting valve and the second fitting valve.

7. The water purifier of claim 1, wherein the fitting valve module includes:

a fitting valve selectively engaged with the filter module; and a valve hook caught on the valve support when the fitting valve module is placed in a predetermined position in the separated state.

8. The water purifier of claim 1, further comprising:

a valve for selectively opening and closing a raw water flow path communicating with the fitting valve module to provide raw water; and a circuit board for controlling the valve to close the raw water flow path to the fitting valve module when the fitting valve module is separated from the coupled state.

9. The water purifier of claim 1, further comprising:

a tube coupled to the fitting valve module so as to be bent when the fitting valve module is separated from the coupled state.

10. The water purifier of claim 5, wherein a distance between the filter housing and the filter module in a direction in which the fitting valve module moves is smaller than a maximum separation distance between the handle of the fitting valve module and the guide member in the direction in which the fitting valve module moves.

11. The water purifier of claim 10, wherein the distance between the filter housing and the filter module in the direction in which the fitting valve module moves is a gap between the filter housing and the filter module toward the fitting valve module in a state in which the filter module is accommodated in the filter housing.

\* \* \* \* \*